US011977144B2

(12) United States Patent
Nicholls et al.

(10) Patent No.: US 11,977,144 B2
(45) Date of Patent: May 7, 2024

(54) SYSTEM AND METHOD FOR IMPROVED RADAR SENSITIVITY

(71) Applicant: Nanowave Technologies Inc., Etobicoke (CA)

(72) Inventors: Charles William Tremlett Nicholls, Nepean (CA); Justin Miller, Etobicoke (CA); Keegan Pitre, Ottawa (CA)

(73) Assignee: Nanowave Technologies Inc., Etobicoke (CA)

( * ) Notice: Subject to any disclaimer, the term of this patent is extended or adjusted under 35 U.S.C. 154(b) by 728 days.

(21) Appl. No.: 17/058,421

(22) PCT Filed: May 24, 2019

(86) PCT No.: PCT/CA2019/050710
§ 371 (c)(1),
(2) Date: Nov. 24, 2020

(87) PCT Pub. No.: WO2019/222858
PCT Pub. Date: Nov. 28, 2019

(65) Prior Publication Data
US 2021/0156978 A1    May 27, 2021

Related U.S. Application Data

(60) Provisional application No. 62/676,209, filed on May 24, 2018.

(51) Int. Cl.
*G01S 13/30* (2006.01)
*G01S 7/02* (2006.01)
*G01S 7/282* (2006.01)

(52) U.S. Cl.
CPC .............. *G01S 13/30* (2013.01); *G01S 7/025* (2013.01); *G01S 7/282* (2013.01)

(58) Field of Classification Search
CPC .......... G01S 13/30; G01S 7/025; G01S 7/282
See application file for complete search history.

(56) References Cited

U.S. PATENT DOCUMENTS

| 4,328,495 A * | 5/1982 | Thue ..................... G01S 13/53 342/132 |
| 5,036,324 A * | 7/1991 | Lamper ................. G01S 13/284 342/135 |

(Continued)

FOREIGN PATENT DOCUMENTS

| EP | 1365472 B1 | 12/2007 |
| EP | 1604427 B1 | 2/2010 |
| WO | 2016204665 A1 | 12/2016 |

OTHER PUBLICATIONS

International Patent Application No. PCT/CA2019/050710, International Preliminary Report on Patentability dated Nov. 24, 2020.

(Continued)

*Primary Examiner* — Peter M Bythrow
(74) *Attorney, Agent, or Firm* — BORDEN LADNER GERVAIS LLP

(57) ABSTRACT

A solid state RADAR antenna system is provided comprising at least one antenna configured to transmit a plurality of antenna beams. Each antenna beam is decoupled from each of the other plurality of antenna beams for transmitting in a blind range of a different antenna beam. Accordingly, in an implementation, the second antenna beam is transmitted so as to scan a first blind range associated with the first antenna beam. Decoupling antenna beams can be achieved using one or more of physical decoupling using different antennas, frequency decoupling using different bands and/or frequency multiplexing, or orthogonal polarization.

17 Claims, 13 Drawing Sheets

(56) References Cited

U.S. PATENT DOCUMENTS

| | | | |
|---|---|---|---|
| 5,420,598 A | 5/1995 | Uematsu et al. | |
| 6,104,343 A | 8/2000 | Brookner et al. | |
| 6,232,920 B1 | 5/2001 | Brookner et al. | |
| 6,600,457 B2 | 7/2003 | Heinz et al. | |
| 6,639,546 B1* | 10/2003 | Ott | G01S 13/20 |
| | | | 342/135 |
| 7,081,848 B1* | 7/2006 | Adams | G01S 7/2923 |
| | | | 342/134 |
| 7,724,176 B1 | 5/2010 | Pruett et al. | |
| 8,446,326 B2 | 5/2013 | Tietjen | |
| 11,073,607 B2* | 7/2021 | Koubiadis | G01S 7/0232 |
| 2013/0278455 A1* | 10/2013 | Song | G01S 13/288 |
| | | | 342/137 |
| 2014/0292563 A1* | 10/2014 | Palmer | G01S 7/28 |
| | | | 342/175 |
| 2015/0301158 A1* | 10/2015 | Foreman | G01S 13/5244 |
| | | | 342/159 |
| 2016/0195607 A1* | 7/2016 | Roulston | G01S 13/106 |
| | | | 342/201 |
| 2018/0156908 A1* | 6/2018 | Silander | G01S 13/106 |

OTHER PUBLICATIONS

International Patent Application No. PCT/CA2019/050711, International Preliminary Report on Patentability dated Nov. 24, 2020.
International Patent Application No. PCT/CA2019/050710, International Search Report and Written Opinion dated Jul. 31, 2019.
International Patent Application No. PCT/CA2019/050711, International Search Report and Written Opinion dated Jul. 31, 2019.
U.S. Appl. No. 17/058,382, Non-Final office Action dated May 25, 2023.
U.S. Appl. No. 17/058,382, Notice of Allowance dated Nov. 16, 2023.
U.S. Appl. No. 17/058,382, Notice of Allowance dated Oct. 12, 2023.

* cited by examiner

SYSTEM AND METHOD FOR IMPROVED RADAR SENSITIVITY

CROSS REFERENCE TO RELATED APPLICATIONS

The present disclosure is related to co-pending patent application having the same inventors as the present application and entitled "RADAR ANTENNA SYSTEM AND METHOD" filed of even date herewith, which is incorporated herein by reference.

FIELD

The present disclosure relates to RADAR (Radio Detection and Ranging) systems, including but not limited to radar sensitivity in RADAR antenna systems.

BACKGROUND

RADAR systems use radio waves to detect objects and determine object parameters such as range, angle or velocity. RADAR systems have broad ranges of use, from surveillance and navigation, to weather and meteorological monitoring, and a variety of military applications. A RADAR system can have requirements with respect to beam formation and direction, as well as scan rate. Solid state RADAR antenna systems are increasingly used, though have some limitations compared to vacuum tube based RADAR systems. Active antenna arrays are known to achieve faster scan rates, but are extremely complex and high cost, which limits their applicability to high performance RADAR systems.

Conventional solid state RADAR antenna systems are unable to resolve target locations from signal reflections received while transmitting. Accordingly, conventional solid state RADAR systems transmit an antenna beam comprised of a repeating pulse allowing the transceiver to receive reflected signals between transmission pulses. The issue remains however that the solid state RADAR system is periodically rendered blind during signal transmission. The blind range resulting from a signal pulse is equal to half the pulse length, or alternatively, half the pulse duration multiplied by the speed of light. Accordingly, a 200 µs pulse will leave conventional systems blind to targets located within a distance of 30 km of the transmitting antenna. One solution known in the art is to append a short pulse to the transmitted signal, thereby allowing detection of short pulse reflections from targets located within the blind range arising from the long pulse signal. However, the transmitted energy of the short pulse is significantly lower, and thus, short pulse reflections may be too weak to detect and receive, resulting in an inability to resolve targets located within the blind range arising from the long pulse signal.

Improvements in RADAR architecture and antenna systems are desirable.

BRIEF DESCRIPTION OF THE DRAWINGS

Embodiments of the present disclosure will now be described, by way of example only, with reference to the attached Figures.

DETAILED DESCRIPTION

Figure 1:
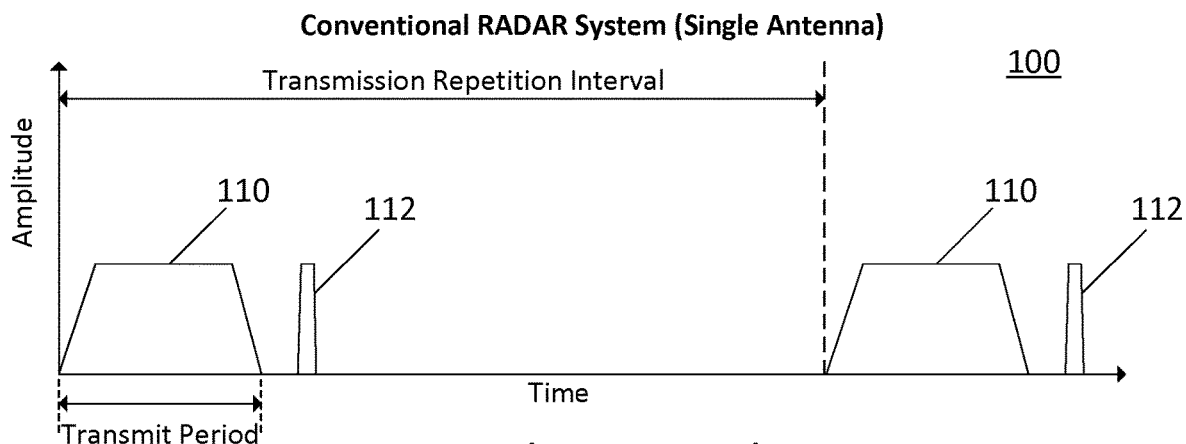
FIG. 1 illustrates a timing diagram for pulses sent by a conventional RADAR.

A solid state RADAR antenna system is provided comprising at least one antenna configured to transmit a plurality of antenna beams. Each antenna beam is decoupled from each of the other plurality of antenna beams for transmitting in a blind range of a different antenna beam. Accordingly, in an implementation, the second antenna beam is transmitted so as to scan a first blind range associated with the first antenna beam. Decoupling antenna beams can be achieved using one or more of physical decoupling using different antennas, frequency decoupling using different bands and/or frequency multiplexing, or orthogonal polarization.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meaning as used in this context are set forth below. To the extent a term used herein is not defined below, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

The terms "reflectivity," "radar cross section," and similar terms are intended to have a broad meaning in harmony with the common and accepted usage by those of ordinary skill in the art to which the subject matter of this disclosure pertains. It should be understood by those skilled in the art who review this disclosure that while these terms may be associated with particular RADAR systems, such as reflectivity being associated with weather RADAR systems, these terms may be used interchangeably to broadly refer to how detectable an object may be, using different frames of reference.

The terms "minimum detectable signal level", "RADAR sensitivity," and similar terms, including interrelated terms such as "reflectivity," and "radar cross section," are intended to have broad meaning in harmony with the common and accepted usage by those of ordinary skill in the art to which the subject matter of this disclosure pertains. It should be understood by those skilled in the art that the signal power of a reflected signal must be at least equal to or greater than a minimum detectable signal level corresponding to the minimum received power at which a RADAR system is able to receive a reflected signal. Accordingly, RADAR sensitivity encompasses the range of targets that a RADAR system may be able to detect, where an increase in the breadth of detectable targets corresponds to an increase in RADAR sensitivity; and, a decrease in the breadth of detectable targets corresponds to a decrease in RADAR sensitivity.

The terms "separation," "isolation," "decoupling," and similar terms are intended to have a broad meaning in harmony with the common and accepted usage by those of ordinary skill in the art to which the subject matter of this disclosure pertains. It should be understood by those skilled in the art that separating antenna beams generally refers to isolating or decoupling one antenna beam from another such that there is minimal cross interference from one antenna beam to another, such that echo signals for each antenna beam may be received independently of other antenna beams.

Conventional solid state RADAR antenna systems may be designed to unambiguously scan, without limitation, volume spaces (e.g. weather RADAR systems) or resolve targets. For example, it may be desired to employ or design a RADAR system able to unambiguously scan a volume space or resolve targets 60 km away from the RADAR system. To scan the 60 km range, solid state RADAR antenna systems transmit antenna beams comprising a pulse train or series of repeated signal pulses permitting the system to receive echo signals (or reflected signals) between transmissions of pulses. Transmission of signal pulses is repeated at intervals corresponding to the transmission repetition interval (or pulse repetition interval), for example as shown in FIG. 1, to be described later in detail. The interval is determined by the time duration for a pulse to transmit and return to the antenna after reflecting off a max range target. In other words, transmission of the next pulse does not begin until the RADAR system has waited an interval of time necessary to receive a signal echo off a target placed at the edge of a maximum unambiguous range. The interval may be calculated by multiplying the desired maximum unambiguous range by two, further divided by the speed of light ($3.0 \times 10^8$ m/s). In the instant example, a desired unambiguous range of 60 km corresponds to a transmission repetition interval of 400 μs (or transmission repetition frequency of 2.5 kHz).

The signal pulse transmits for a period of time (or pulse duration) which may be determined by the duty cycle of a solid state power amplifier (SSPA) multiplied by the transmission repetition interval. For example, a solid state RADAR antenna system with an SSPA operating at a 20% duty cycle and transmitting a pulse every 400 μs will transmit a pulse having an 80 μs transmit period. SSPA duty cycles are typically set in accordance with the junction temperature of the active device, usually in the range of 10% to 20%, but those skilled in the art will appreciate that a wide variety of duty cycles are possible.

Signal pulses may achieve comparable transmitted energy as, for example, a travelling wave tube transmitter. The transmitted energy of a signal pulse equals the transmit period multiplied by the transmitted power. Accordingly, increasing transmit period or transmitted power increases transmitted energy. For example, a 1 μs signal pulse having a transmitted power of 100 kW will have the same transmitted energy as a 10 μs signal pulse having a transmitted power of 10 kW, or as a 100 μs signal pulse having a transmitted power of 1 kW.

Solid state RADAR systems resolve volume spaces and targets by receiving echo signals created by collision between the transmitted signal and objects, for example and without limitation, echoes may result from weather effects such as rain, snow, and clouds; or from objects such as vehicles and planes. Solid state RADAR systems are able to resolve echo signals having a received power at or above a minimum detectable signal level of the RADAR system. In some implementations a solid state RADAR system may be able to receive signals having −105 dbm. The energy of the echo signal received by the solid state RADAR system will depend on many factors including distance. In weather radar systems, those skilled in the art may consider the reflectivity of the volume space when determining the received power of an echo signal. Other types of radar systems may however consider the radar cross-section (RCS) of the target when determining the received power of an echo signal. Low reflectivity volume spaces or low RCS targets are problematic as higher energy transmission signals may be required to obtain an echo signal at or above the minimum detectable signal level of the system. Accordingly, echo signals arising from short pulses appended to long pulses in conventional systems are particularly difficult to receive and resolve due to their low transmission energy.

Under transmission conditions, signal power is blocked from entering the receiver by a signal limiter which protects the receiver from damage; consequently, the RADAR receiver is not capable of receiving signals while the RADAR is in transmission mode. As such, volume spaces and targets are resolved by receiving echo signals during periods of non-transmission as the RADAR system is otherwise blind during transmission. The issue of blind range arises from the ambiguity relating to signal transmissions reflecting back to the antenna before the antenna has completed transmitting the signal. By way of example the blind range for a signal pulse transmitted from a solid state RADAR system having a pulse duration of 80 μs is 12 km. This is determined by calculating one-half of the pulse length (24 km) where the pulse length is the pulse duration (80 μs) multiplied by the speed-of-light ($3.0 \times 10^8$ m/s). Consider further a target located 9 km away from the solid state RADAR system. The leading edge of a signal pulse will take 30 μs to propagate to the target, and another 30 μs to reflect and propagate back to the antenna, totaling 60 μs of travel time. However, the solid state RADAR system will still be in transmission mode for another 20 μs and unable to receive the echo signal due to the signal limiter. Thus, for a given transmission period, there is a blind range corresponding to distances where a target may not be able to be resolved. Accordingly, the unambiguous range of a conventional RADAR system spans from the end of the blind range to the maximum scanning distance of the system. In the instant example, a single long pulse of 80 μs repeated every 400 μs results in a blind range from 0 to 12 km and an unambiguous range from 12 km to 60 km.

FIG. 1 is a timing diagram 100 illustrating pulses sent by a conventional solid state RADAR antenna system for resolving volume spaces or targets located in a blind range arising from a long pulse 110. This approach appends a second signal pulse or short pulse 112 to long pulse 110. The interval between transmitting long pulse 110 and short pulse 112 is chosen to be long enough so as to distinguish short pulse echoes from long pulse echoes. Notably, long pulse 110 has a significantly longer transmit period than short pulse 112, and thus has higher transmission energy. Long pulse 110 may for example have a transmit period of 80 μs corresponding to a blind range from 0 to 12 km whereas short pulse 112 may have a transmit period of 1 μs corresponding to a blind range of 0 to 150 m. Transmission of each pulse is repeated with a transmission repetition frequency corresponding to the transmission repetition interval (or pulse repetition interval). Thus, an antenna beam or pulse train in accordance with FIG. 1 may comprises a long pulse 110 appended by a short pulse 112 repeating every transmission repetition interval, the resulting system having a blind range from 0 to 150 m.

Appending a short pulse to a long pulse to mitigate blind range as illustrated in FIG. 1 has drawbacks. Because transmission energy for a signal pulse is dependent on transmit period, a short pulse will transmit with lower transmission energy than a longer pulse. The transmission energy of a 1 μs signal pulse for example, is reduced by a factor of 80 in comparison to the transmission energy of an 80 μs signal pulse having the same transmitted power. Accordingly, at a given distance, the required reflectivity in the volume space for a weather RADAR system to detect a short pulse is higher than the reflectivity required to detect a longer pulse.

Improvements in conventional blind range mitigation techniques are achieved in accordance with the solid state RADAR systems disclosed herein.

A system and method for improved RADAR sensitivity are provided herein. In an implementation, the RADAR antenna system comprises at least one antenna configured to transmit a first antenna beam and a second antenna beam wherein the first antenna beam is decoupled from the second antenna beam. The first antenna beam comprises a first pulse transmitted for a first transmit period. A first blind range and a first transmission repetition interval corresponding to a maximum unambiguous range are associated with the first antenna beam. The second antenna beam comprises a second pulse transmitted for a second transmit period. A second blind range and a second transmission repetition interval associated with the second antenna beam are selected to define a second unambiguous range substantially equal to the first blind range.

Figure 2:
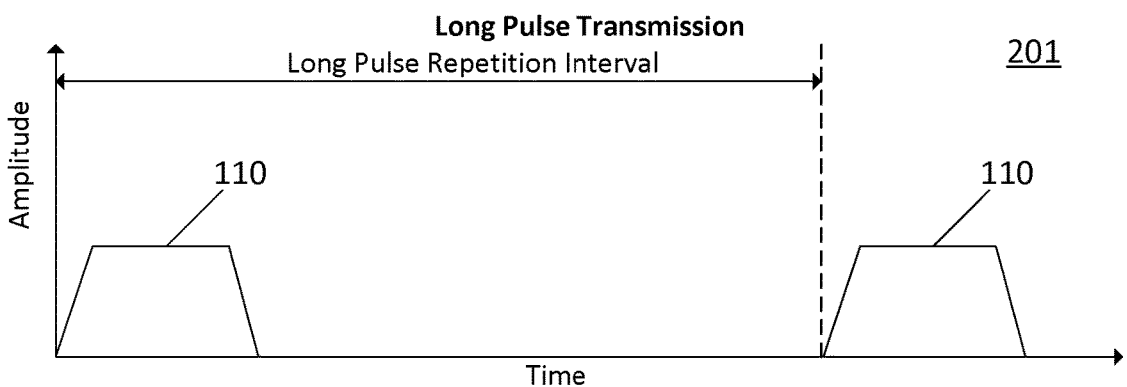
FIG. 2 illustrates a timing diagram for two pulses decoupled and transmitted according to an embodiment of the present disclosure.
Figure 2:
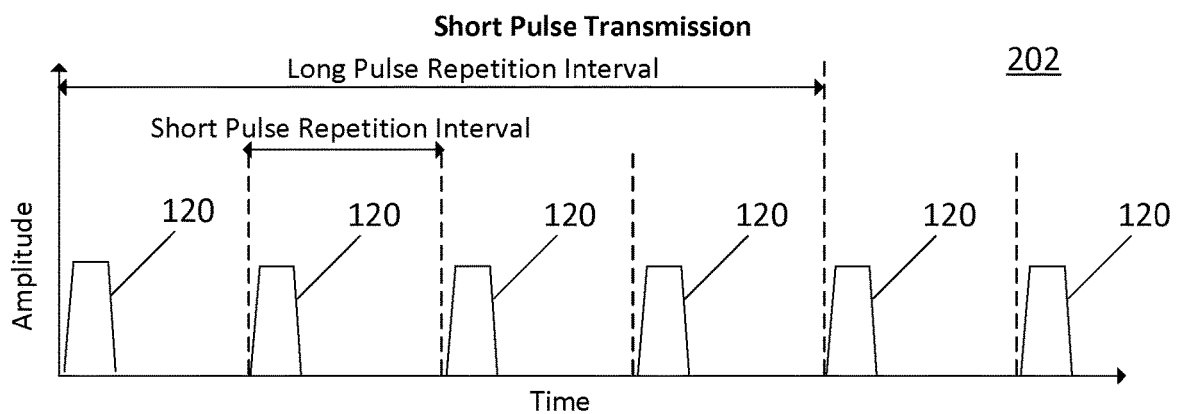

FIG. 2 illustrates a first pulse diagram 201 and a second pulse diagram 202. First pulse diagram 201 illustrates a first antenna beam comprising a first pulse 110 repeating every long pulse repetition interval, or first transmission repetition interval. The first transmission repetition interval corresponds to a maximum scan range, or desired scan range, for a solid state RADAR antenna system. First pulse 110 is transmitted for a first transmit period, which may be determined by the maximum duty cycle of the corresponding transmission antenna's SSPA and the first transmission repetition interval. For an antenna having a maximum scan range of 60 km operating with an SSPA having a 20% maximum duty cycle, the first antenna beam will comprise a pulse transmitted every 400 μs for 80 μs, corresponding to a first blind range from 0 to 12 km, and an first unambiguous range from 12 km to 60 km.

Second pulse diagram 202 illustrates a second antenna beam comprising a second pulse 120 decoupled from first pulse 110. Decoupling, without limitation, may include separating, isolating, or otherwise lowering cross-contamination between first pulse 110 and second pulse 120. As will be discussed in greater detail, decoupling includes physical decoupling, frequency decoupling, and orthogonal polarization.

Second pulse 120 has a short pulse repetition interval (or second transmission repetition interval) corresponding to the first blind range of first pulse 110. In the instant example, the second unambiguous range is selected based on the first blind range of 12 km. Accordingly, second pulse 120 repeats transmission every short pulse repetition interval, 80 μs. Second pulse 120 has a second transmit period which may be determined by the maximum duty cycle of the corresponding transmission antenna's SSPA and the second transmission repetition interval. For an antenna having a maximum unambiguous range of 12 km operating with an SSPA having a 20% maximum duty cycle, the second antenna beam will comprise second pulse 120 transmitted every 80 μs for 16 μs, corresponding to a second blind range from 0 to 2.4 km, and a second unambiguous range from 2.4 km to 12 km.

Decoupling short pulse 120 from long pulse 110 in accordance with the embodiment of FIG. 2 provides improvements over conventional solid state RADAR antenna systems. For example, short pulse 120 in FIG. 2 has a longer transmit period than short pulse 112 in FIG. 1, resulting in short pulse 120 having higher transmission energy. Accordingly, echo signals arising from short pulse 120 are comparatively higher in energy than echo signals arising from short pulse 112. Short pulse 120 will thus produce echo signals at or above the minimum detectable signal level for lower reflectivity volume spaces in comparison to short pulse 112, thereby improving RADAR sensitivity to volumes spaces located in a blind range of a first pulse 110. Further, four short pulses 120 are transmitted for every single short pulse 112, providing a factor of four improvement in scan rates.

Figure 3:
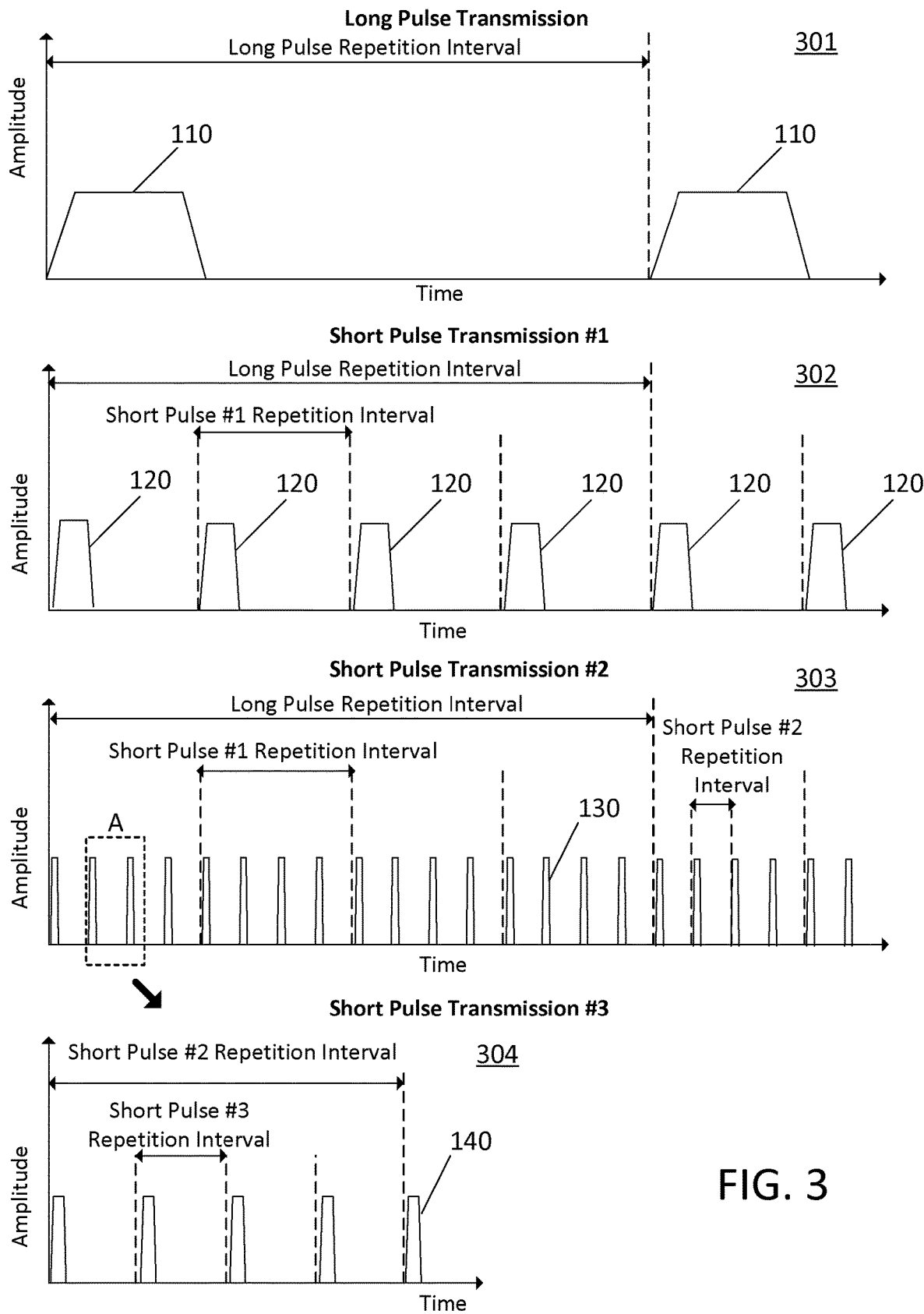
FIG. 3 illustrates a timing diagram for four pulses decoupled and transmitted according to an embodiment of the present disclosure.

FIG. 3 illustrates a first pulse diagram 301, second pulse diagram 302, third pulse diagram 303, and fourth pulse diagram 304, corresponding to pulses from first, second, third, and fourth antenna beams, respectively, as transmitted from a solid state RADAR antenna system according to an embodiment as disclosed herein. Each antenna beam is decoupled from each other antenna beam by at least one of physical decoupling, frequency decoupling, and orthogonal polarization.

In an embodiment, each antenna beam corresponds to a separate antenna. In such an embodiment, first pulse 110 is physically decoupled from second pulse 120, third pulse 130, and fourth pulse 140. In this example embodiment, each pulse is uniquely associated with one antenna and is physically decoupled from pulses associated with the other antennas.

In another embodiment, first pulse 110 and second pulse 120 may transmit from a first antenna which implements frequency decoupling or orthogonal polarization to decouple first pulse 110 from second pulse 120. A second antenna transmitting third pulse 130 and fourth pulse 140 may also implement frequency decoupling or orthogonal polarization to decouple third pulse 130 from fourth pulse 140; and the first and second antennas are physically decoupled such that the eradiated power from either antenna does no impinge on the other antenna during transmission.

First pulse diagram 301 and second pulse diagram 302 are copies of first pulse diagram 201 and second pulse diagram 202, respectively. Third pulse diagram 303 illustrates pulse 130, configured to scan and resolve a volume space or target located within a blind range arising from second pulse 140. Fourth pulse diagram 304 illustrates fourth pulse 140 transmitting across a span of time corresponding to box A as illustrated in third pulse diagram 303. In this sense, fourth pulse diagram 304 illustrates an enlarged scale relative to third pulse diagram 303. Fourth pulse 140 is configured to scan and resolve a volume space or target located within a blind range arising from third pulse 130. In the instant example, where second pulse 120 transmits every 80 μs for 16 μs, third pulse 130 will transmit every 16 μs for 3.2 μs corresponding to a blind range of 0 to 480 m and an unambiguous range of 480 to 2.4 km; and fourth pulse 140 will transmit every 3.2 μs for 0.64 μs corresponding to a blind range of 0 to 96 m and an unambiguous range of 96 m to 480 m.

Figure 4:
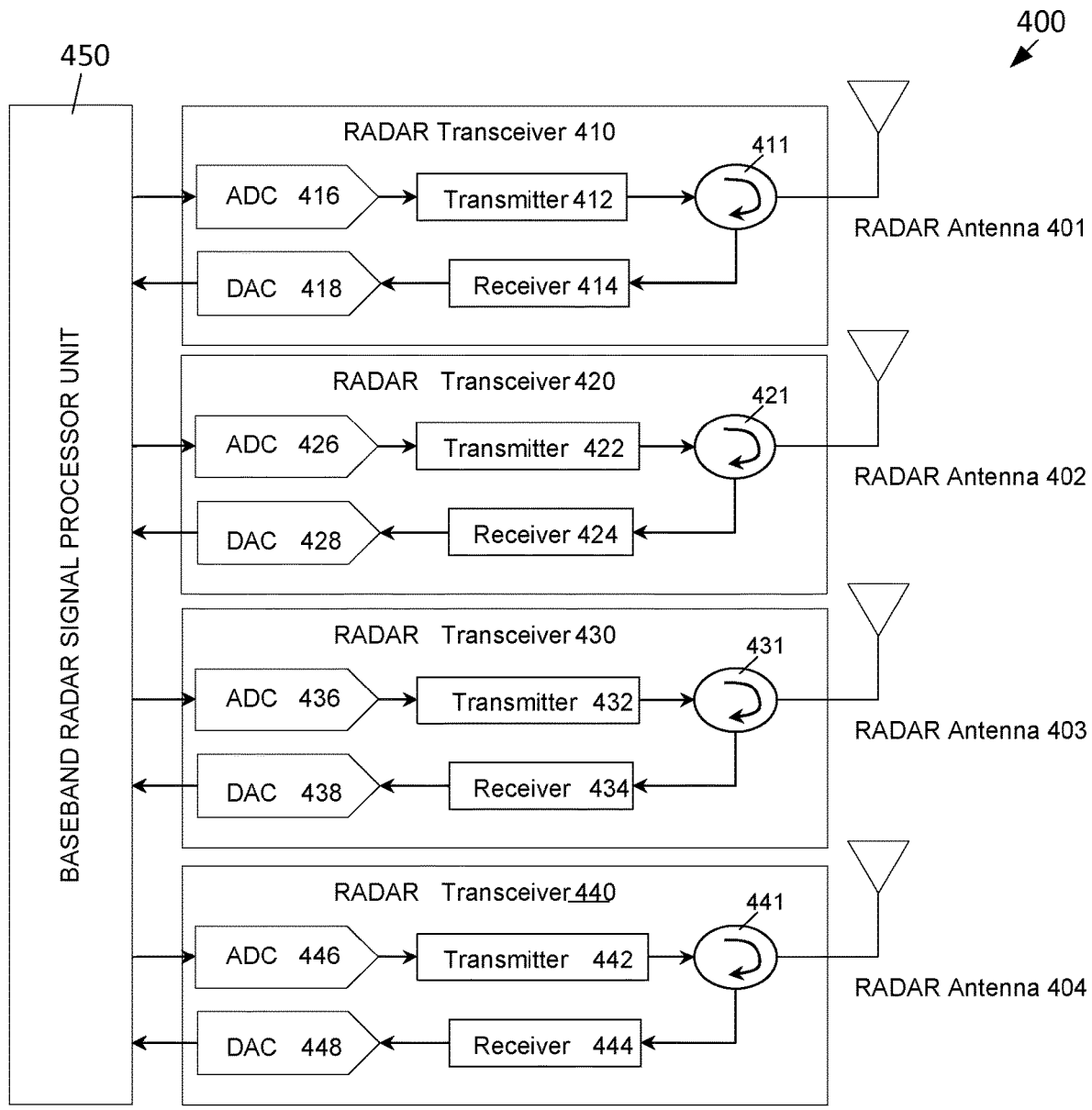
FIG. 4 is a block diagram illustrating a RADAR antenna system according to an embodiment of the present disclosure.

FIG. 4 is a block diagram illustrating the electrical signal elements of a RADAR antenna system 400 according to an embodiment of the present disclosure. The embodiment of FIG. 4 illustrates a plurality of antennas 401, 402, 403 and 404 which may transmit antenna beams comprising signal pulses, for example, the signal pulses depicted in pulse diagrams 301, 302, 303, and 304, respectively. While the example embodiment of FIG. 4 illustrates four RADAR antennas, other embodiments include two RADAR antennas, or other numbers of RADAR antennas.

Each RADAR antenna 401, 402, 403, 404 is in communication with a respective RADAR transceiver 410, 420, 430, 440. In an embodiment, the first RADAR transceiver 410 comprises a circulator 411 in communication with both a transmitter 412 and a receiver 414. An analog/digital converter (ADC) 416 is in communication with the transmitter 412, and a digital/analog converter (DAC) 418 is in communication with the receiver 414. Similarly, the second RADAR transceiver 420 comprises: a circulator 421 in communication with both a transmitter 422 and a receiver 424; an ADC 426 in communication with the transmitter 422; and a DAC 428 in communication with the receiver 424. The third RADAR transceiver 430 comprises: a circulator 431 in communication with both a transmitter 432 and a receiver 434; an ADC 436 in communication with the transmitter 432; and a DAC 438 in communication with the receiver 434. The fourth RADAR transceiver 440 comprises: a circulator 441 in communication with both a transmitter 442 and a receiver 444; an ADC 446 in communication with the transmitter 442; and a DAC 448 in communication with the receiver 444.

The system further comprises a processor unit 450, such as a baseband RADAR signal processor unit, in communication with each of the ADCs 416, 426, 436 and 446 and with each of the DACs 418, 428, 438 and 448. In an example implementation, the processor unit 450 is configured to perform post-processing for the plurality of antennas 401, 402, 403 and 404 to align the post-processing results from the plurality of antennas.

Antennas in a RADAR system according to an embodiment of the present disclosure, such as the system 400 shown in FIG. 4, may comprise antennas which transmit antenna beams comprising a pulse train or series of repeated signal pulses. A signal pulse from a solid state RADAR system may achieve comparable transmitted energy as, for example, a travelling wave tube transmitter. The transmitted energy of a signal pulse equals the pulse duration (or transmit period) multiplied by the transmitted power.

Figure 5A:
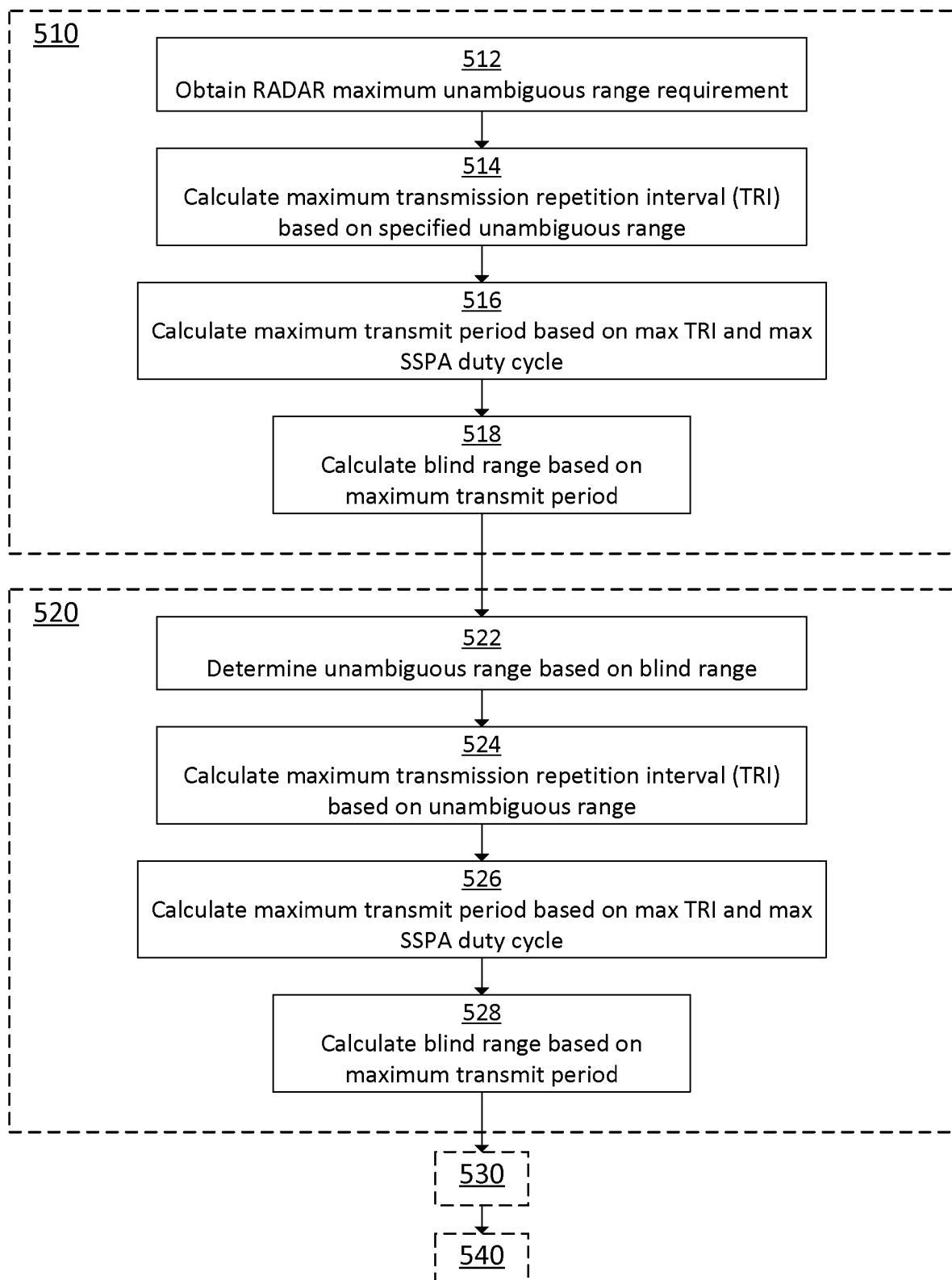
FIG. 5A is a flowchart illustrating a method of blind range mitigation in a RADAR antenna system according to an embodiment of the present disclosure.
Figure 5B:
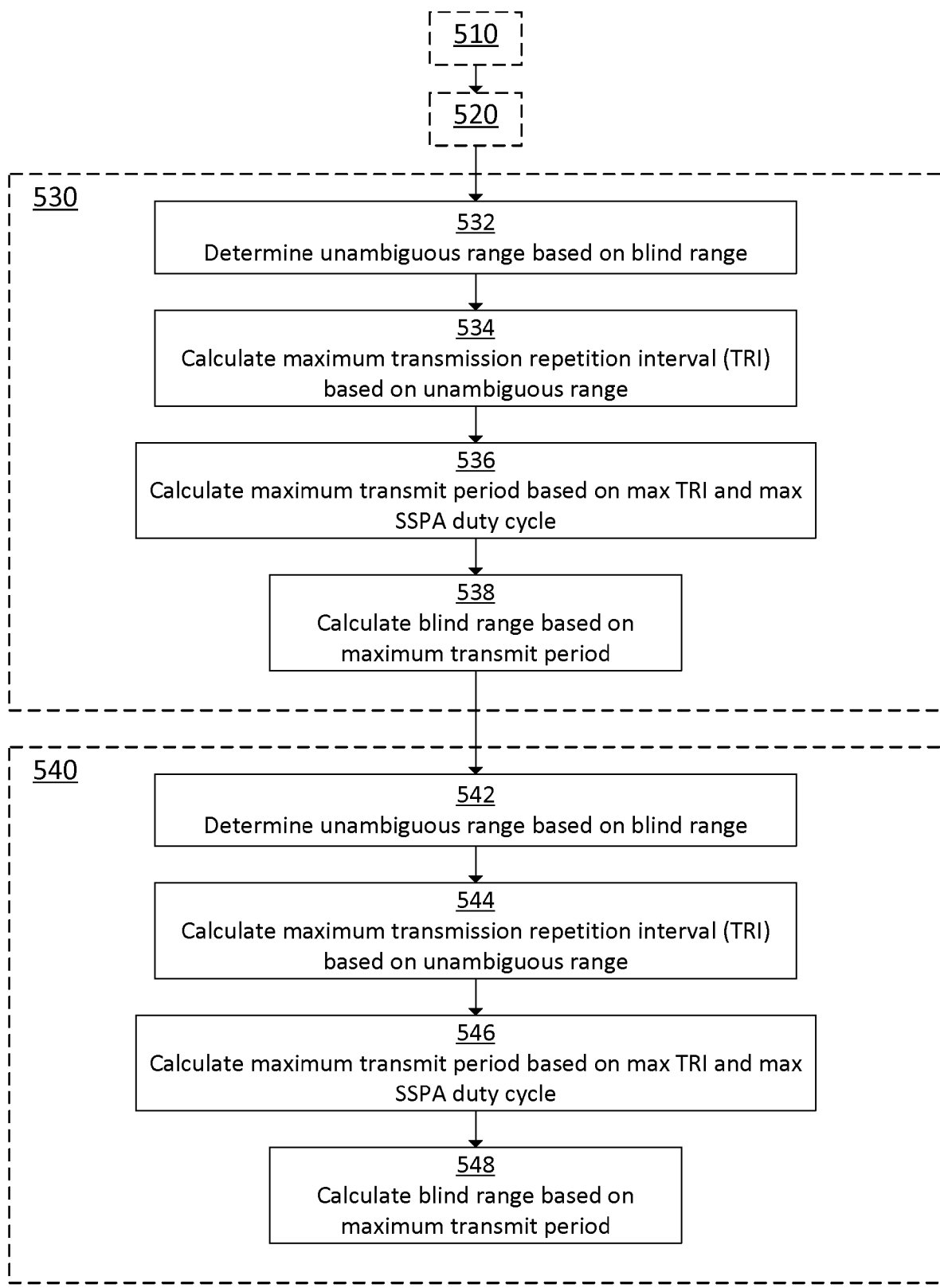
FIG. 5B is a flowchart illustrating a method of blind range mitigation in a RADAR antenna system according to an embodiment of the present disclosure.

FIGS. 5A and 5B are flowcharts illustrating a method for improving RADAR sensitivity by setting the unambiguous scan range of an antenna based on the blind range of a different decoupled antenna in accordance with an embodiment of the present disclosure. The flowcharts of the embodiments shown in FIGS. 5A and 5B relate to a RADAR system comprising four antennas, such as antenna 401, 402, 403, and 404 illustrated in FIG. 4 corresponding to four RADAR transceivers 410, 420, 430 and 440 which configure each of the four antennas. While the example embodiment of FIGS. 4, 5A and 5B illustrates four RADAR antennas, other embodiments include two RADAR antennas, or other numbers of RADAR antennas configured to improve RADAR sensitivity by scanning in a blind range of another antenna.

FIGS. 5A and 5B comprise steps 510, 520, 530 and 540 corresponding to transceivers 410, 420, 430, and 440, respectively, for configuring antennas 401, 402, 403, and 404 of a solid state RADAR antenna system 400. First, at step 512, a maximum unambiguous range for RADAR antenna system 400 is obtained for first radar transceiver 410. The maximum unambiguous range may be based on desired system performance or on a maximum scan range hardware limitation. In the instant example, a solid state RADAR antenna system having a maximum scan range of 60 km is employed.

Step 514 comprises calculating the transmission repetition interval (TRI) for the first antenna beam transmitted by first antenna 401 based on the maximum unambiguous range input to the first radar transceiver 410 at step 512. The transmission repetition interval equals twice the unambiguous range divided by the speed of light. For a maximum unambiguous range of 60 km, the resulting transmission repetition interval is 400 μs. Step 516 comprises calculating the maximum transmission period (or alternatively, the transmission length) based on the transmission repetition interval determined in step 514 and a maximum SSPA duty cycle of 20% resulting in a transmit period of 80 μs or transmission length of 24 km. Step 518 comprises calculating the blind range for first antenna 401 based on the transmit period (or alternatively, based on the transmission length) determined in step 516. The blind range equals half the transmission length determined in step 516. Accordingly, the blind range associated with a maximum transmission length of 24 km (corresponding to a maximum transmission period of 80 μs) is 0 to 12 km where 12 km corresponds to the maximum blind range.

Thus in the instant example, first radar transceiver 410 configures first antenna 401 based on steps 512, 514, 516, and 518 to transmit an antenna beam having a transmission length of 24 km (corresponding to a transmission period of 80 μs) and transmission repetition interval of 400 μs, whereby first antenna 410 has a blind range from 0 to 12 km and unambiguous range from 12 km to 60 km. As detailed further, these steps are essentially replicated for each subsequent radar transceiver to configure subsequent antennas for transmitting an antenna beam to scan a blind range of another antenna beam, resulting in an improvement in RADAR sensitivity over conventional RADAR system.

At step 522, the maximum blind range determined in step 518 is provided to second radar transceiver 420 as the maximum unambiguous range for second antenna 402, which is 12 km. In other words, second antenna 402 is selected to have a maximum unambiguous range substantially equal to the maximum blind range of first antenna 401. In an example embodiment, the maximum blind range in step 518 is input to second radar transceiver 420.

At step 524, the maximum unambiguous range of 12 km determined in step 522 is used to calculate the maximum transmission repetition interval for the second antenna beam transmitted by second antenna 402, which is 80 µs.

At step 526, the maximum transmission repetition interval of 80 µs determined in step 524 and 20% maximum SSPA duty cycle associated with second antenna 402 are used to calculate the transmit period for the second antenna beam transmitted by second antenna 402, which is 16 µs, corresponding to a transmission length of 4.8 km.

At step 528, the maximum transmission length of 4.8 km determined in step 526 is used to calculate the blind range for second antenna 402, which is 0 to 2.4 km, where, 2.4 km is the maximum blind range.

Thus, second transceiver 420 configures second antenna 402 based on steps 522, 524, 526, and 528 to transmit an antenna beam having a transmit period of 16 µs (corresponding to a transmission length of 4.8 km) and transmission repetition interval of 80 µs, whereby second antenna 402 has a blind range from 0 to 2.4 km and unambiguous range from 2.4 km to 12 km.

Turning to FIG. 5B, at step 532, the maximum blind range determined in step 528 in FIG. 5A is provided to third radar transceiver 430 as the maximum unambiguous range for third antenna 403, which is 2.4 km. In other words, third antenna 403 is selected to have a maximum unambiguous range substantially equal to the maximum blind range of second antenna 402.

At step 534, the maximum unambiguous range of 2.4 km determined in step 532 is used to calculate the maximum transmission repetition interval for the third antenna beam transmitted by third antenna 403, which is 16 µs.

At step 536, the maximum transmission repetition interval of 16 µs determined in step 534 and 20% maximum SSPA duty cycle associated with third antenna 403 are used to calculate the transmit period for the third antenna beam transmitted by third antenna 403, which is 3.2 µs, corresponding to a transmission length of 960 m.

At step 538, the maximum transmission length of 960 m determined in step 536 is used to calculate the blind range for third antenna 403, which is 0 to 480 m, where, 480 m is the maximum blind range.

Thus, third transceiver 430 configures third antenna 403 based on steps 532, 534, 536, and 538 to transmit an antenna beam having a transmit period of 3.2 µs (corresponding to a transmission length of 960 m) and transmission repetition interval of 16 µs, whereby third antenna 403 has a blind range from 0 to 480 m and unambiguous range from 480 m to 2.4 km.

At step 542, the maximum blind range determined in step 538 is provided to fourth radar transceiver 440 as the maximum unambiguous range for fourth antenna 404, which is 480 m. In other words, fourth antenna 404 is selected to have a maximum unambiguous range substantially equal to the maximum blind range of third antenna 403.

At step 544, the maximum unambiguous range of 480 m determined in step 542 is used to calculate the maximum transmission repetition interval for the fourth antenna beam transmitted by fourth antenna 404, which is 3.2 µs.

At step 546, the maximum transmission repetition interval of 3.2 µs determined in step 544 and 20% maximum SSPA duty cycle associated with fourth antenna 404 are used to calculate the transmit period for the fourth antenna beam transmitted by fourth antenna 404, which is 0.64 µs, corresponding to a transmission length of 192 m.

At step 548, the maximum transmission length of 192 m determined in step 546 is used to calculate the blind range for fourth antenna 404, which is 0 to 96 m, where, 96 m is the maximum blind range.

Thus, fourth transceiver 430 configures fourth antenna 404 based on steps 542, 544, 546, and 548 to transmit an antenna beam having a transmit period of 0.64 µs (corresponding to a transmission length of 192 m) and transmission repetition interval of 3.2 µs, whereby fourth antenna 404 has a blind range from 0 to 96 m and unambiguous range from 96 m to 480 m. The above steps may be repeated to configure additional solid state RADAR antennas in the RADAR antenna system.

Figure 6:
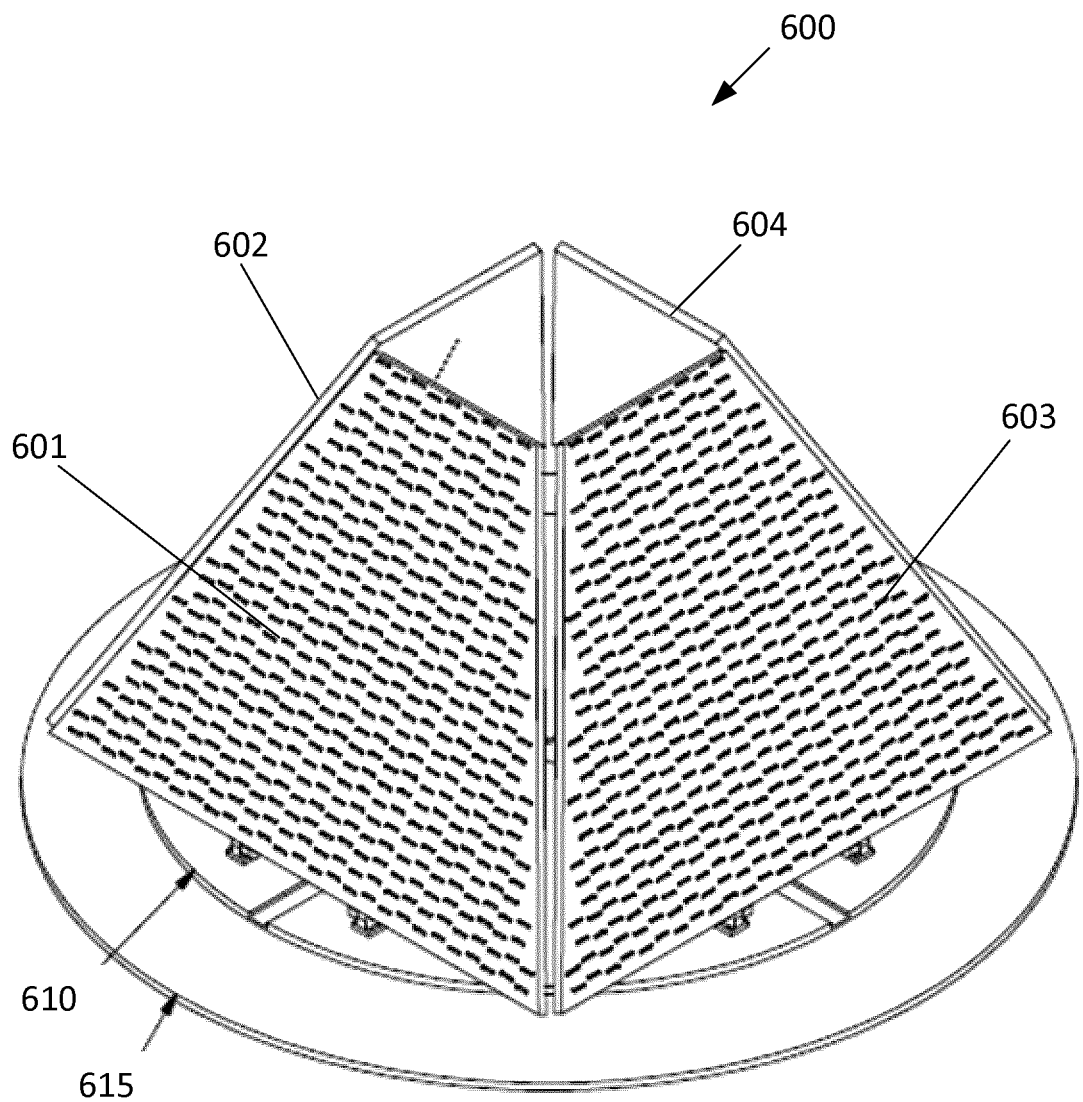
FIG. 6 illustrates a top perspective view of a RADAR antenna system according to an embodiment of the present disclosure having four antennas shown in an inclined position.
Figure 7:
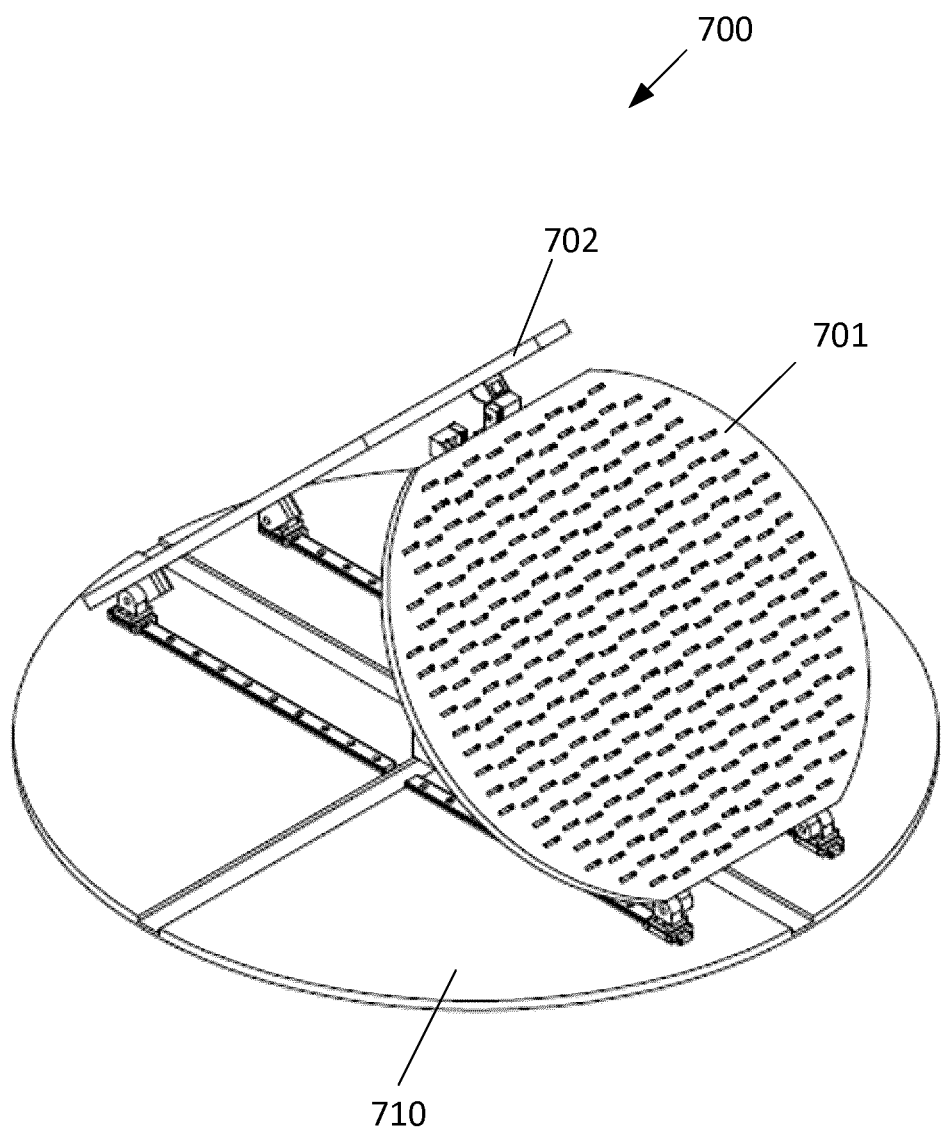
FIG. 7 illustrates a top perspective view of a RADAR antenna system according to an embodiment of the present disclosure having two antennas shown in an inclined position.

In an embodiment, the solid state RADAR antenna system physically decouples the plurality of antenna beams using separate antennas for each antenna beam allowing the plurality of antenna beams to scan in the blind range of a different antenna beam, thereby improving RADAR sensitivity. FIGS. 6 and 7 are illustrative embodiments of such systems, where separate antennas are provided such that the eradiated power from one antenna does not impinge on the other antennas during transmission (and vice versa). FIG. 6 is illustrative of a four antenna embodiment having isosceles trapezoidal shaped antennas, and FIG. 7 is illustrative of a two antenna embodiment having generally circular or annular shaped antennas. However, these embodiments are merely illustrative of specific examples. One skilled in the art will appreciate in view of the present disclosure that RADAR antenna systems as disclosed herein may comprise a wide variety of setups not limited to 2 or 4 antennas, or the shapes and types of antennas disclosed in FIGS. 6 and 7. Additional details are provided in related to co-pending patent application having the same inventors as the present application and entitled "RADAR ANTENNA SYSTEM AND METHOD" filed of even date herewith, which is incorporated herein by reference.

FIG. 6 illustrates a top perspective view of a RADAR antenna system 600 according to another embodiment of the present disclosure having four physically decoupled antennas shown in a tilted position. In the example embodiment of FIG. 6, the four antennas 601, 602, 603 and 604 each have an isosceles trapezoidal shape, though other shapes can be used. The antenna shapes used in embodiments of the present disclosure, including the shape in FIG. 6, are primarily used to allow maximum tilt angle and maximum antenna physical aperture. In some embodiments, such antennas will also provide increased side lobe suppression. In the example embodiment of FIG. 6, a radar dome mounting plate 615 is provided to facilitate mounting of a radar dome, while the antennas are mounted on the antenna mounting plate 610, or base.

FIG. 7 illustrates a top perspective view of a RADAR antenna system 700 according to an embodiment of the present disclosure having two antennas shown in a tilted position. The RADAR antenna system 700 comprises a base 710, a first antenna 701 and a second antenna 702. In the example embodiment shown in FIG. 7, each of the first and second antennas 701 and 702 comprises a slotted array antenna, for example a slotted flat plate antenna having a generally circular or annular shape, and in an embodiment having two opposing flat edges.

In another embodiment, the first and second antennas 701 and 702 comprise dual polar antennas. In a dual polar implementation, one polarization is vertical, and one is horizontal. An implementation running dual polar antennas on both antennas provides an advantage, such as reducing cross-polarization. In another dual polar implementation, one pole is run from the first antenna and the other pole is run from the second antenna.

The first and second antennas 701 and 702 are configured to transmit independent and decoupled first and second antenna beams, respectively. In an embodiment, the first antenna beam may comprise a pulse having a longer transmit period and transmission repetition interval than the second antenna beam. The first and second antennas 701 and 702 are each coupled to the base 710 so as to provide a common rotational axis for the first and second antennas.

The transmission of decoupled antenna beams according to embodiments of the present disclosure has thus far been primarily described with respect to physical decoupling. Examples are now provided with respect to embodiments manifesting different decoupling.

In an embodiment, a solid state RADAR antenna system decouples a plurality of antenna beams using frequency-division multiplexing for transmitting from a single antenna. Such an approach allows the plurality of antenna beams to scan in the blind range of a different antenna beam, thereby improving RADAR sensitivity.

Figure 8:
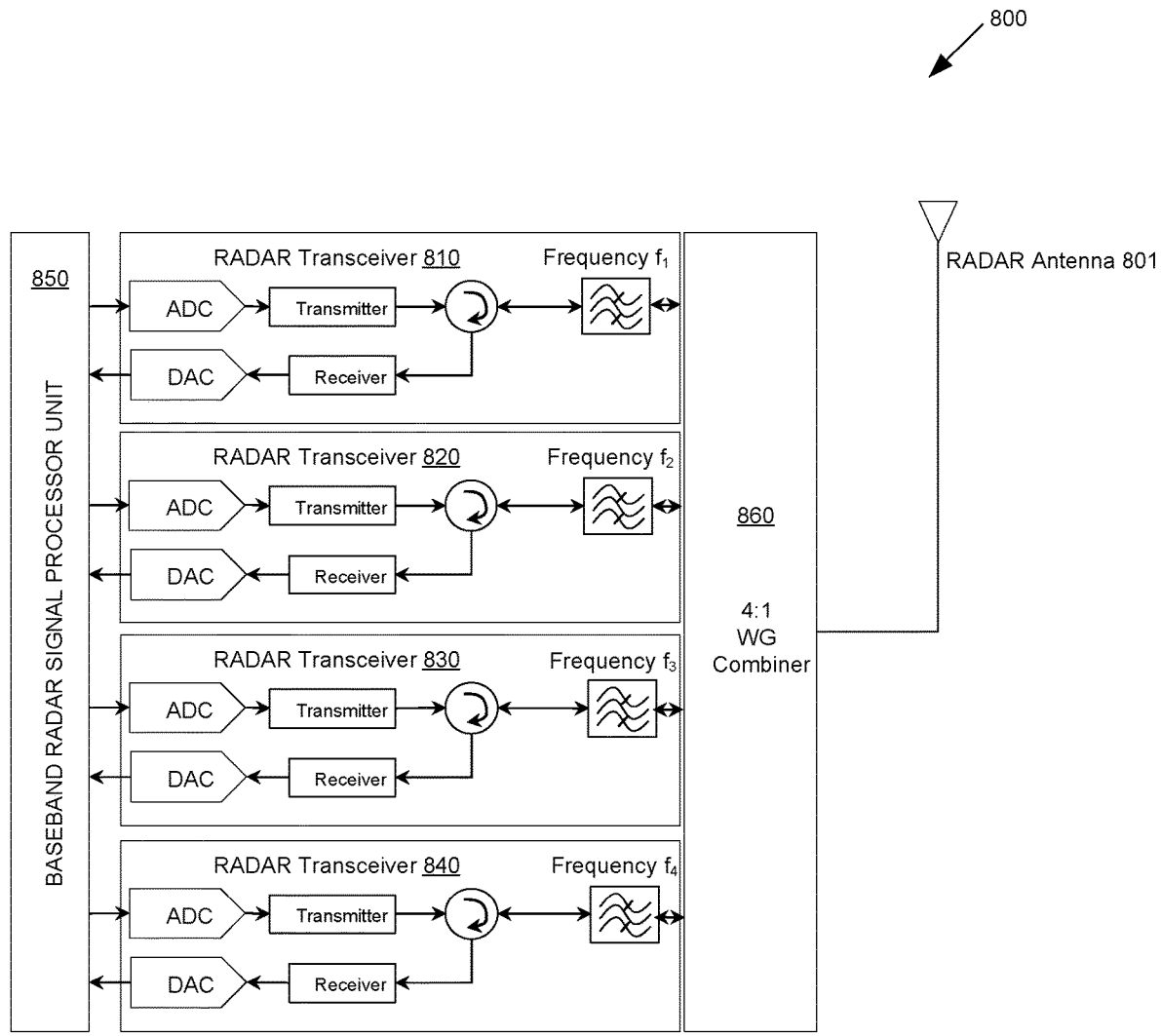
FIG. 8 is a block diagram illustrating a RADAR antenna system according to another embodiment of the present disclosure.

FIG. 8 is an illustrative embodiment of such a system 800, comprising radar transceivers 810, 820, 830, and 840 for transmitting antenna beams carried at frequencies $f_1$, $f_2$, $f_3$, and $f_4$, respectively. Each antenna beam may comprise a pulse train or series of repeated signal pulses where, for example: radar transceiver 810 generates a first antenna beam having a first unambiguous range, first transmission repetition interval, first transmit period, and first blind range; radar transceiver 820 generates a second antenna beam comprising a second unambiguous range based on the first blind range, and further comprising a second transmission repetition interval, second transmit period, and second blind range; radar transceiver 830 generates a third antenna beam comprising a third unambiguous range based on the second blind range, and further comprising a third transmission repetition interval, third transmit period, and third blind range; and radar transceiver 840 generates a fourth antenna beam comprising a fourth unambiguous range based on the third blind range, and further comprising a fourth transmission repetition interval, fourth transmit period, and fourth blind range. In this embodiment, each antenna beam inputs to a 4:1 waveguide combiner 860, which outputs to antenna 801 as a single antenna beam. While the example embodiment of FIG. 8 illustrates four RADAR transceivers, other embodiments include two RADAR transceivers coupled to a 2:1 waveguide combiner, or other numbers of RADAR transceivers coupled to an appropriately configured waveguide combiner or other frequency multiplexing implement. In another embodiment, received echo signals propagate through a de-multiplexer (not illustrated) to separate the received signal into the plurality of antenna beams.

FIG. 8 is a block diagram illustrating the electrical signal elements of a RADAR antenna system 800 according to an embodiment of the present disclosure. The embodiment of FIG. 8 illustrates a single antenna for transmitting a frequency multiplexed antenna beam produced by waveguide 860. Waveguide 860 receives an antenna beam generated by each of transceivers 810, 820, 830, and 840 and carried at frequencies $f_1$, $f_2$, $f_3$, and $f_4$, respectively.

As similarly illustrated in FIG. 4, each RADAR transceiver depicted in the embodiment of FIG. 8 comprises a circulator in communication with a transmitter and a receiver, and additionally in communication with waveguide combiner 860. An analog/digital converter (ADC) is in communication with each transmitter, and a digital/analog converter (DAC) is in communication with the receiver. The system 800 further comprises a processor unit 850, such as a baseband RADAR signal processor unit, in communication with each ADC and each DAC. In another embodiment, one or more RADAR transceivers may include different elements than shown in FIG. 8, while still providing similar functionality with respect to inputs and outputs from the RADAR transceiver.

In an embodiment, the solid state RADAR antenna system decouples the plurality of antenna beams using orthogonal polarization, allowing a single antenna, such as a dual polar antenna, to transmit a first antenna beam at a first polarization and a second antenna beam at a second polarization orthogonal to the first, thereby decoupling the first and second antenna beams, allowing one beam to scan the blind range of the other and improving RADAR sensitivity. RADAR sensitivity may however be impaired by cross-polarization.

Figure 9:
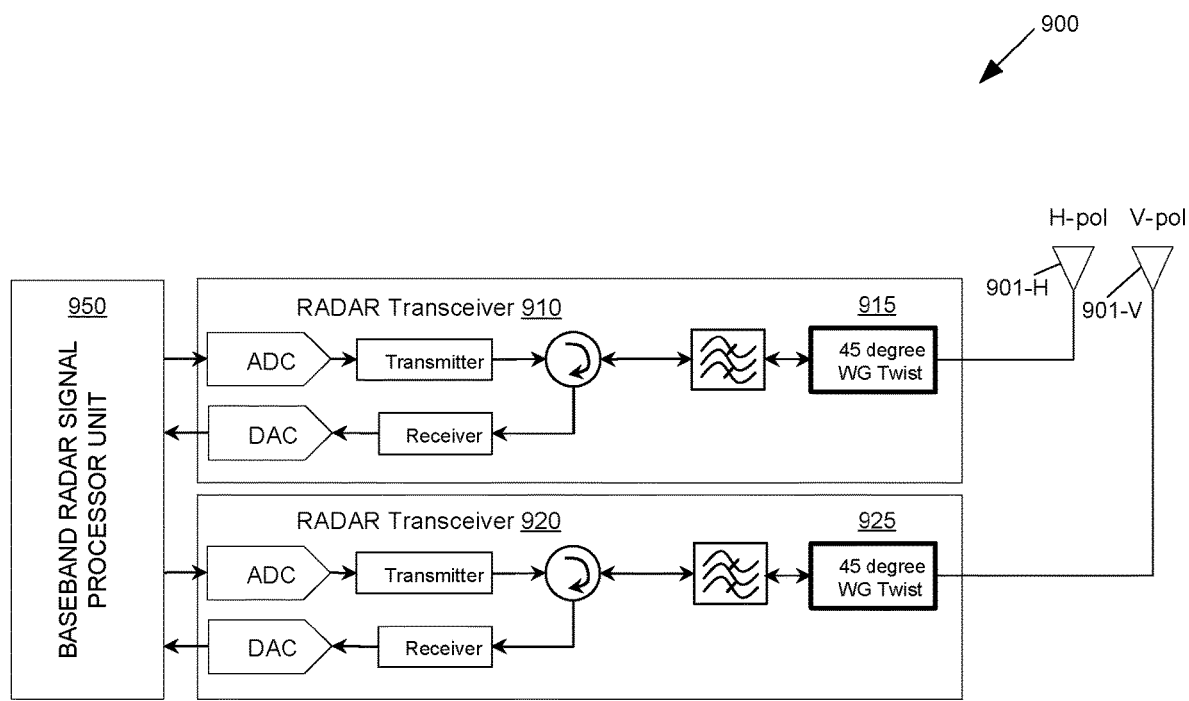
FIG. 9 is a block diagram illustrating a RADAR antenna system according to another embodiment of the present disclosure.

FIG. 9 is an illustrative embodiment of a solid state RADAR antenna system comprising radar transceivers 910 and 920 for transmitting antenna beams carried at a first polarization 901-H and a second polarization 901-V, respectively. Each antenna beam may comprise a pulse train or series of repeated signal pulses where for example radar transceiver 910 generates a first antenna beam having a first unambiguous range, first transmission repetition interval, first transmit period, and first blind range; and, radar transceiver 920 generates a second antenna beam comprising a second unambiguous range based on the first blind range, and further comprising a second transmission repetition interval, second transmit period, and second blind range. In the illustrative embodiment, the first antenna beam is polarized by 45 degrees using a first waveguide 915, and the second antenna beam is polarized 45 degrees using a second waveguide 925, whereby the first and second antenna beams are orthogonal to each other. In this embodiment, first polarization 901-H comprises a horizontal pole and second polarization 901-V comprises a vertical pole orthogonal to the horizontal pole. While the example embodiment of FIG. 9 illustrates a single dual polar antenna for generating two orthogonal antenna beams, other embodiments may include a plurality of dual polar antennas. In an embodiment, a RADAR antenna system may comprise a first antenna transmitting a first antenna beam at a first polarization, and a second antenna transmitting a second antenna beam at a second polarization orthogonal to the first. In another embodiment, a plurality of antenna beams may transmit from one or more antennas, including dual-polar antennas wherein each antenna beam is transmitted with a polarization orthogonal to each of the plurality of antenna beams. In another embodiment, a RADAR antenna system may comprise a plurality of antenna beams wherein at least two antenna beams are decoupled by orthogonal polarization.

As similarly illustrated in FIG. 4, each RADAR transceiver depicted in the embodiment of FIG. 9 comprises a circulator in communication with a transmitter and a receiver, and additionally in communication with a waveguide. An analog/digital converter (ADC) is in communication with each transmitter, and a digital/analog converter (DAC) is in communication with the receiver. The system 900 further comprises a processor unit 950, such as a baseband RADAR signal processor unit, in communication with each ADC and each DAC. In another embodiment, one or more RADAR transceivers may include different elements than shown in FIG. 9, while still providing similar functionality with respect to inputs and outputs from the RADAR transceiver.

Figure 10:
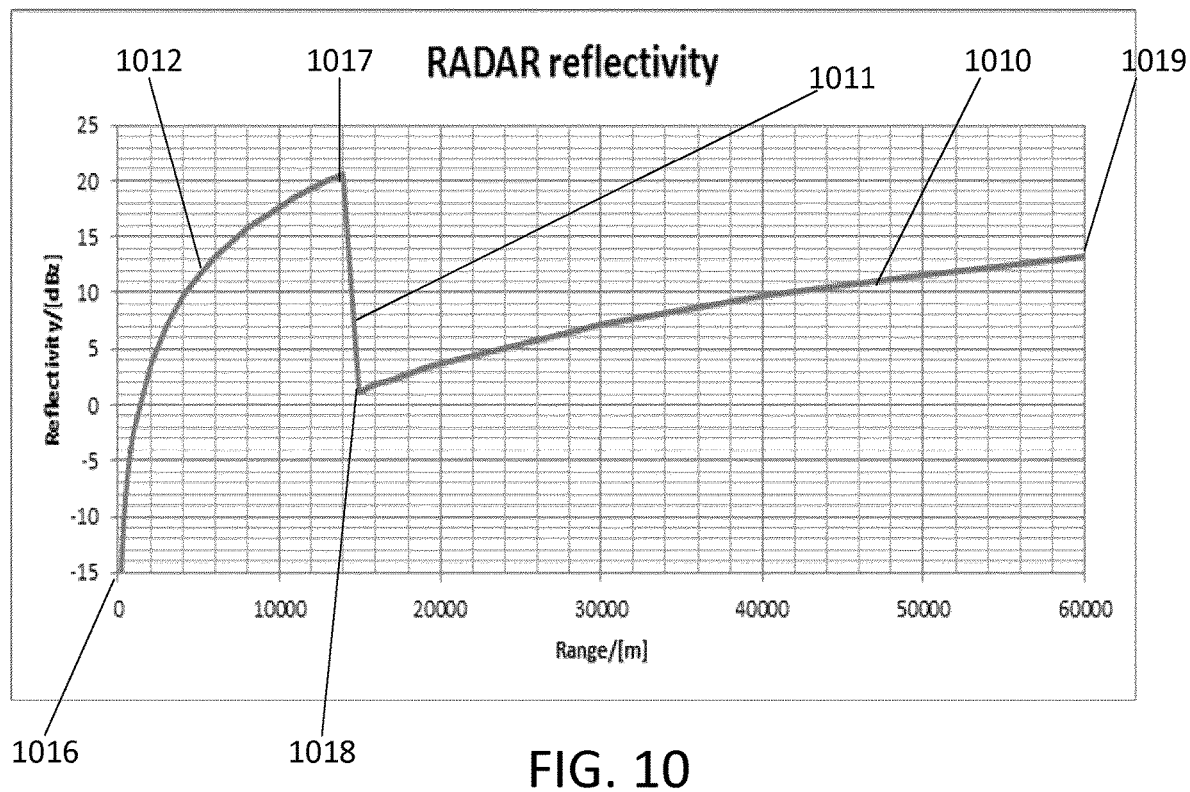
FIG. 10 illustrates a graph of RADAR reflectivity associated with a conventional RADAR system.

FIG. 10 illustrates a graph of RADAR reflectivity required to receive an echo signal at or above a minimum detectable signal level at a given distance from a conventional solid state RADAR antenna system transmitting a long pulse appended by a short pulse as illustrated for example in FIG. 1. The y-axis corresponds to the reflectivity required to receive an echo signal at or above a minimum detectable signal level in relation to a distance along the x-axis from the transmitting antenna. While reflectivity is typically associated with weather RADAR systems, those skilled in the art will appreciate that reflectivity is but one means for relating the power of an echo signal received at the RADAR system. Alternatively, in other RADAR systems, the y-axis may correspond for example to the radar cross-section of a target, and thus the graph would be presented with different metrics. However, the same trends and observations made below will still hold true across other RADAR systems, or systems characterized according to other parameters or characteristics.

FIG. 10 is illustrative of a conventional solid state RADAR system transmitting an antenna beam comprising a 100 μs long pulse appended by a 1 μs short pulse and having a 400 μs transmission repetition interval. This results in the long pulse having a blind range from 0 to 15 km and an unambiguous range from 15 km to 60 km and the short pulse having a blind range from 0 to 150 m and an unambiguous range from 150 m to 60 km. However, because the transmission energy of the long pulse is significantly higher than the short pulse, the short pulse practically may only assist in resolving distances unambiguously from 150 m to 15 km. Accordingly, the plot comprises three segments, a short pulse segment 1012, overlap segment 1011, and long pulse segment 1010.

Short pulse segment 1012 charts the minimum reflectivity required to detect the 1 μs short pulse reflecting off targets ranging in distance from 150 m to 14 km at or above a minimum detectable signal level. The first point 1016 on short pulse segment 1012 corresponds to the reflectivity required to detect a 1 μs short pulse reflecting off a target located 150 m away from the transmitting antenna, which in this instance, requires a minimum reflectivity of −15 dBz. The last point 1017 on short pulse segment 1012 corresponds to the reflectivity required to detect a 1 μs short pulse reflecting off a target located 14 km away from the transmitting antenna, which in this instance, requires a minimum reflectivity of approximately 20 dBz.

Overlap segment 1011 charts the minimum reflectivity required to detect an antenna beam comprising a 100 μs long pulse appended by a 1 μs short pulse reflecting off targets ranging in distance from 14 km to 15 km. In this range, the significantly stronger transmission energy of the long pulse begins coupling with the short pulse. As illustrated in FIG. 10, the required reflectivity reduces from 20 dBz at point 1017 (corresponding to a target distance of 14 km) to approximately 1 dBz at point 1018 (corresponding to a target distance of 15 km).

Long pulse segment 1010 charts the minimum reflectivity required to detect a 100 μs long pulse reflecting off targets ranging in distance from 15 km to 60 km at or above a minimum detectable signal level. The first point 1018 on long pulse segment 1010 corresponds to the reflectivity required to detect a 100 μs long pulse reflecting off a target located 15 km away from the transmitting antenna, which in this instance, requires a minimum reflectivity of approximately 1 dBz. The last point 1019 on long pulse segment 1010 corresponds to the reflectivity required to detect a 100 μs long pulse reflecting off a target located 60 km away from the transmitting antenna, which in this instance, requires a minimum reflectivity of approximately 13 dBz. Notably, due to differences in transmission energy, the minimum reflectivity required to detect a 1 μs pulse reflecting off a target 14 km away from the transmitting antenna as indicated at point 1017 (20 dBz) is higher than the reflectivity required to detect a 100 μs pulse reflecting off a target 60 km away from the transmitting antenna as indicated at point 1019 (13 dBz).

Figure 11:
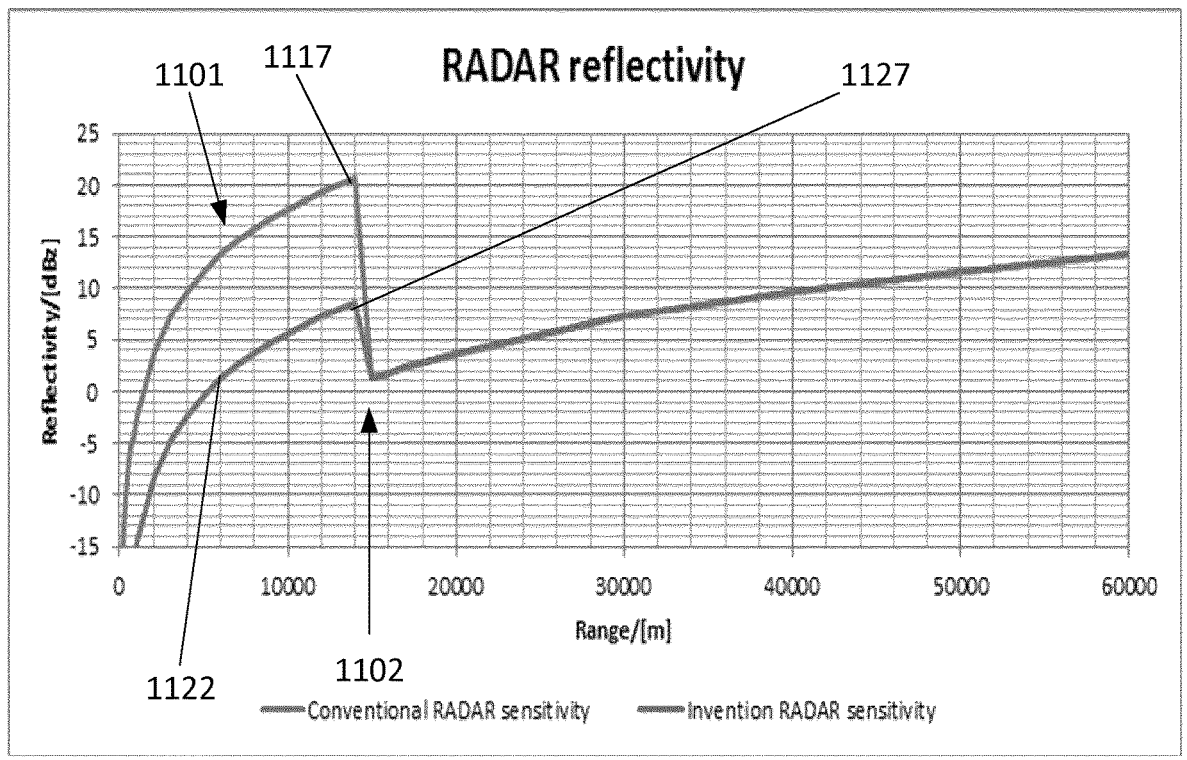
FIG. 11 illustrates a graph of RADAR reflectivity associated with a system transmitting two decoupled pulses according to an embodiment of the present disclosure.

FIG. 11 is a graph illustrating RADAR reflectivity associated with a system according to an embodiment of the present disclosure comprising first and second antennas transmitting first and second antenna beams, respectively, as compared against a conventional radar transmitting a conventional antenna beam comprising a long pulse appended by a short pulse. FIG. 11 demonstrates improvements in RADAR sensitivity as illustrated by reductions in the minimum required reflectivity to detect an echo signal at or above a minimum detectable signal level using a multi antenna solid state RADAR system as disclosed herein.

The conventional plot 1101 is identical to the plot illustrated in FIG. 10 and represents the minimum reflectivity requirements to detect a reflected signal at or above a minimum detectable signal level as arising from an antenna beam comprising a 100 μs long pulse appended by a 1 μs short pulse and having a 400 μs pulse repetition interval. The two-antenna plot 1102 illustrates the minimum reflectivity required to detect reflected signals at or above a minimum detectable signal level arising from first and second antenna beams transmitted respectively by the first and second antennas of a solid state RADAR antenna system according to an embodiment disclosed herein. The first antenna is configured to transmit a first antenna beam having a 100 μs transmit period with a 400 μs transmission repetition interval corresponding to a blind range from 0 to 15 km and an unambiguous range from 15 km to 60 km. The second antenna is configured to transmit a second antenna beam having a 4 μs transmit period with a 100 μs transmission repetition interval corresponding to a blind range from 0 to 600 m and an unambiguous range from 600 m to 15 km. In this illustrative example, the transmission repetition interval of the second antenna beam corresponds to a maximum unambiguous range equal to the blind range of the first antenna. As such, the second antenna is configured to scan volume spaces within the blind range of the first antenna, providing improvements to RADAR sensitivity within a blind range of the first antenna beam.

In the instant example, the second antenna beam transmits four short pulses for every 1 short pulse transmitted by the conventional system. The two antenna system also transmits short pulses having a 4 fold increase in transmission energy as compared to the conventional system due to increasing the transmission period from 1 μs to 4 μs. The net effect is a sixteen fold improvement in RADAR sensitivity with a 25 fold reduction in the blind range from 15 km to 600 m. These improvements are readily apparent when comparing conventional plot 1101 to two antenna plot 1102. For example, second antenna beam segment 1122 charts the minimum reflectivity required to receive the 4 µs at or above a minimum detectable signal level when reflecting off targets ranging in distance from 600 m to 14 km. Point 1127 corresponds to a target distance of 14 km, which requires a minimum reflectivity of approximately 8 dBz to detect reflection of the second antenna beam. Comparatively, the minimum reflectivity required to detect a 1 µs signal pulse reflecting off a target at 14 km as illustrated by point 1117 is approximately 20 dBZ, the two antenna system thus providing a 12 dBz improvement over conventional systems in this example.

As will be appreciated by persons skilled in the art, the foregoing example of blind range mitigation is not limited to the specific system configuration disclosed. For example, a first antenna may be configured to transmit a first antenna beam having a transmission period of 50 µs and pulse repetition interval of 250 µs corresponding to a blind range of 0 to 7.5 km and an unambiguous range from 7.5 km to 37.5 km. Accordingly, a second antenna may be configured to resolve targets within the blind range of the first antenna by configuring the second antenna beam to have a transmission period of 5 µs and pulse repetition interval of 50 µs corresponding to a blind range of 0 to 750 m and an unambiguous range from 750 m to 7.5 km. Alternatively, the transmission period for the second antenna beam may be 10 µs, thereby increasing the transmission energy, lowering the required minimum reflectively, and increasing the blind range to 1.5 km.

In another embodiment, the present disclosure provides a solid state RADAR antenna system comprising a base, and first and second antennas coupled to the base so as to provide a common rotational axis for the first and second antennas. The first antenna is configured to transmit a first antenna beam for a first transmit period. The second antenna is configured to transmit a second antenna beam, independent of transmission of the first antenna beam, for a second transmit period, and with a second transmission repetition interval. The first antenna has an unambiguous range defining a distance beyond which the first antenna unambiguously receives echo signals. The first antenna also has a blind range defining a distance within which the first antenna is unable to receive echo signals during the first transmit period. The second transmission repetition interval, associated with the second antenna, is selected so that the second antenna has an unambiguous range based on the blind range of the first antenna. In this manner, RADAR sensitivity is improved by implementing a second antenna beam to scan a volume space located within a blind range of the first antenna beam, providing an improvement over conventional approaches which append a short pulse to a long pulse.

In some embodiments, the RADAR system is configured to transmit the first and second antenna beams at different elevations, or at different positions. If the antenna beams sweep out the same regions in space but have different blind ranges then the blind range in the direction of the beam is minimized at the time of the scan. If the antenna beams have different beam positions and the same blind ranges then the scan time can be halved for the RADAR. If the antenna beam positions are different and blind ranges are different then the blind range is reduced in any direction but only after completion of the entire scan.

Although the foregoing examples involve a two antenna system, a plurality of antennas may be employed in solid state RADAR antenna systems to address issues arising from blind ranges. In an embodiment, a third antenna is configured to scan volume spaces in the blind range of the second antenna, and further yet, a fourth antenna is configured to scan volume spaces in the blind range of the third antenna. Additional antennas may further be configured to mitigate blind ranges in antennas.

Figure 12:
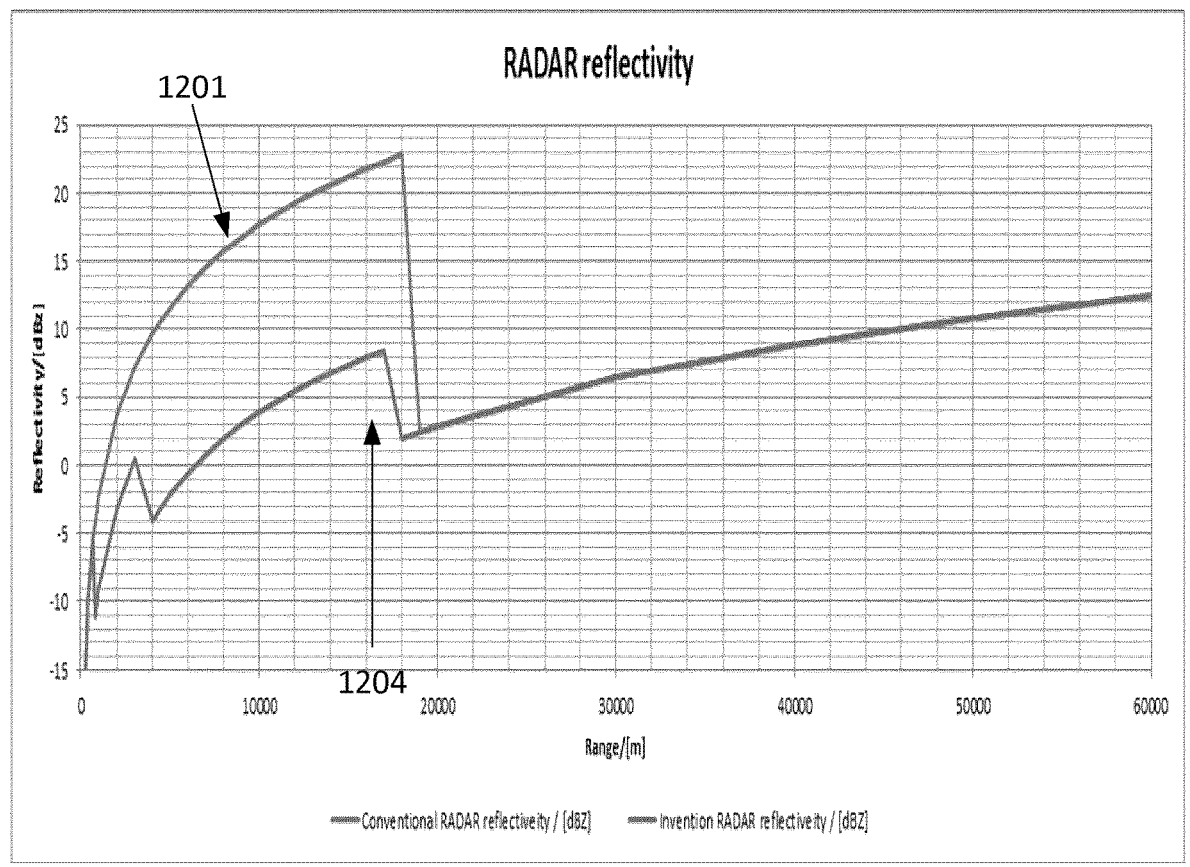
FIG. 12 illustrates a graph of RADAR reflectivity associated with a system transmitting four decoupled pulses according to an embodiment of the present disclosure.
Figure 13:
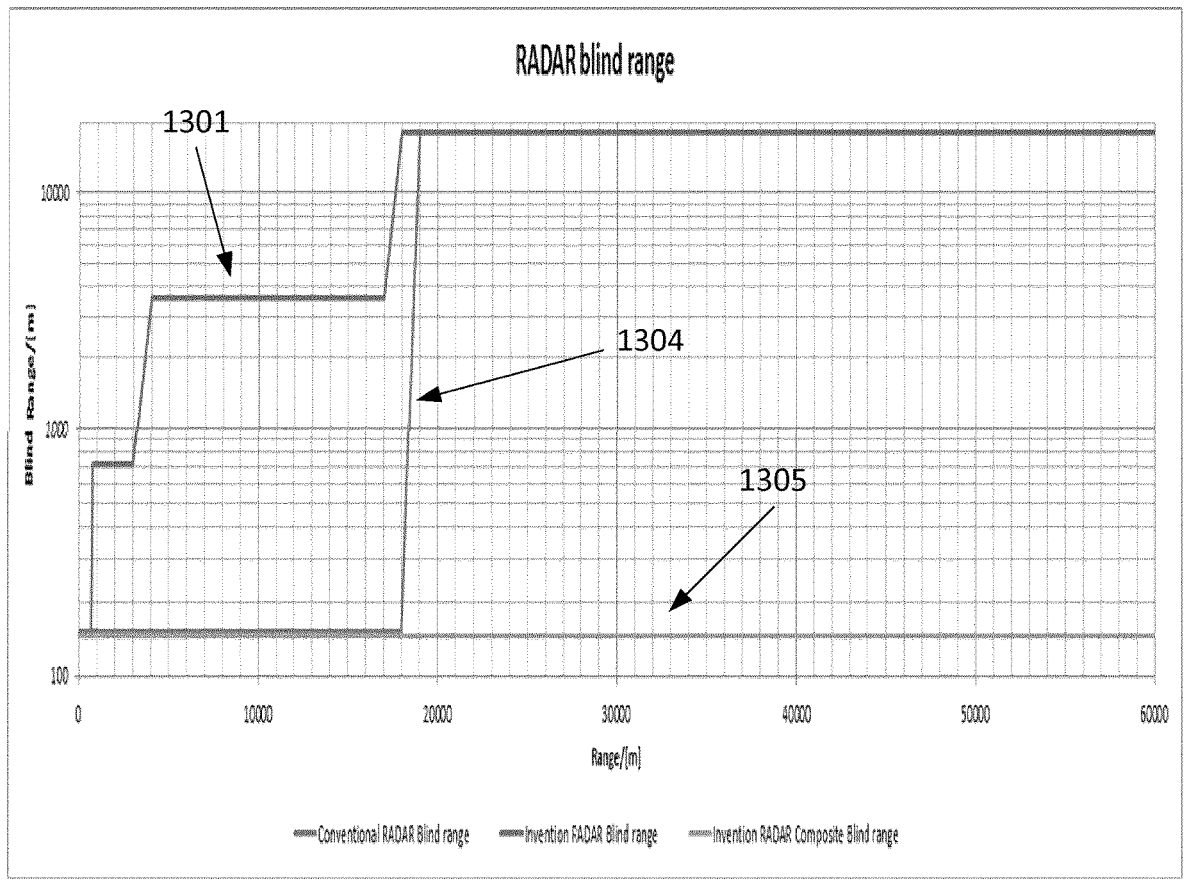
FIG. 13 illustrates a graph of RADAR blind range associated with a system transmitting four decoupled pulses according to an embodiment of the present disclosure.

FIGS. 12 and 13 illustrate the RADAR reflectivity and RADAR blind range for a solid state RADAR antenna system according to an embodiment of the present disclosure comprising four antennas configured in accordance with the method steps of FIGS. 5A and 5B. These are compared to similar reflectivity and blind range for a conventional solid state RADAR antenna system transmitting an antenna beam comprising a long pulse appended by a short pulse.

In particular, FIG. 12 illustrates the RADAR reflectivity for a conventional plot 1201 corresponding to a conventional solid state RADAR antenna system comprising a long pulse appended by a short pulse, and a four antenna plot 1204 corresponding to a solid state RADAR antenna system comprising four antennas as disclosed herein. As is readily apparent, the four antenna system provides a significant improvement in RADAR sensitivity over a conventional system, as realized in part by higher transmission energy resulting in greater power received from reflected signals, thus lower the reflectivity requirements to receive an echo signal at or above a minimum detectable signal level.

Similarly, FIG. 13 illustrates the RADAR blind range for a conventional plot 1301 corresponding to a conventional solid state RADAR antenna system transmitting an antenna beam comprising a long pulse appended by a short pulse, and a four antenna plot 1304 corresponding to a solid state RADAR antenna system comprising four antennas according to an embodiment as disclosed herein. A composite plot 1305 further illustrates the composite blind range for the solid state RADAR antenna system as determined by the shortest pulse in the system. As is readily apparent, the four antenna solid state RADAR system as disclosed herein provides a significant improvement to blind range mitigation, thereby improving RADAR sensitivity over conventional systems.

Embodiments of the present disclosure address the problem of blind range in the RADAR system through implementation of at least one antenna configured to transmit two independent or decoupled antenna beams. Embodiments of the present disclosure can be scaled to 2 antennas, or 4 or more antennas. In the case of 4 antennas, four beams of the same or different frequencies can be implemented. In the case of four antennae system four different frequencies could be operated concurrently.

In an implementation, each antenna is optimized and operated at a different frequency. For example, the system can operate as a true dual band RADAR operating at C-band and X-band. Such a system would enable improved long range weather sensitivity at C-band whilst achieving high resolution short range sensitivity at X-band.

Embodiments of the present disclosure solve the problem of RADAR desensitization in the blind range resulting from the short pulse by providing a separate antenna for each pulse train. Short pulses can be issued at a rate associated with the pulse repetition interval determined for the long pulse blind range. For example, in the case of the RADAR operational range of 60 km with a pulse duration of 100 us the pulse repetition interval is 400 us and the blind range is 15 km. The pulse repetition interval can be increased 4 times if the unambiguous range is set at 15 km for the second antenna. In addition the pulse duration can be set to 4 us which yields a revised blind range of 600 m. However, 4 times as many short pulses can be issued as compared with when the short pulse repetition frequency was set by the long pulse. The net effect is a sixteen fold improvement in the RADAR sensitivity with a 25 fold reduction in the blind range. Embodiments of the present disclosure can provide a 12 dB improvement in the RADAR sensitivity within the blind range.

If a four antenna plate configuration is used the close-in sensitivity of the RADAR can be further improved through provision of four different optimal pulse durations for achieving a required sensitivity within each blind range.

In an aspect, the present disclosure provides a solid state RADAR antenna system. In an embodiment, the system comprises: at least one antenna; and a transceiver in communication with the at least one antenna. The transceiver and the at least one antenna cooperate to transmit a first antenna beam and a second antenna beam, the first antenna beam being decoupled from the second antenna beam. The first antenna beam comprising a first pulse transmitted over a first transmission repetition interval for a first transmit period, the first antenna beam having a first maximum unambiguous range associated with the first transmission repetition interval and having a first blind range associated with the first transmit period. The second antenna beam comprises a second pulse transmitted over a second transmission repetition interval for a second transmit period. The second antenna beam has a second maximum unambiguous range associated with the second transmission repetition interval. The transceiver and the at least one antenna are configured to transmit the second pulse over the second transmission repetition interval so that the second unambiguous range overlaps with the first blind range.

In an example embodiment, the transceiver and the at least one antenna are configured to transmit the second pulse over the second transmission repetition interval so that the second unambiguous range overlaps with a portion of the first blind range.

In an example embodiment, the transceiver and the at least one antenna are configured to transmit the second pulse over the second transmission repetition interval so that the second unambiguous range overlaps with a substantial portion of the first blind range.

In an example embodiment, the first blind range comprises a lower range portion and an upper range portion, and wherein the transceiver and the at least one antenna are configured to transmit the second pulse over the second transmission repetition interval so that the second unambiguous range overlaps with the upper range portion of the first blind range.

In an example embodiment, the transceiver and the at least one antenna are configured to transmit the second pulse over the second transmission repetition interval so that the second unambiguous range encompasses the entire first blind range.

In an example embodiment, the transceiver and the at least one antenna are configured to transmit the second pulse over the second transmission repetition interval so that the second unambiguous range is substantially equal to the first blind range.

In an example embodiment, the at least one antenna comprises first and second antennas; and the transceiver and the first antenna cooperate to transmit the first antenna beam, and the transceiver and the second antenna cooperate to transmit the second antenna beam.

In an example embodiment, the transceiver comprises: a first transceiver cooperating with the at least one antenna to transmit the first antenna beam; and a second transceiver cooperating with the at least one antenna to transmit the second antenna beam. The second transceiver and the at least one antenna are configured to transmit the second pulse over the second transmission repetition interval so that the second unambiguous range overlaps with a portion of the first blind range.

In an example embodiment, the at least one antenna comprises first and second antennas, and the transceiver and the first antenna cooperate to transmit the first antenna beam at a first frequency, and the transceiver and the second antenna cooperate to transmit the second antenna beam at a second frequency, the first antenna beam being frequency decoupled from the second antenna beam.

In an example embodiment, the system further comprises a waveguide combiner coupled to the first and second transceivers to receive the first and second antenna beams and to transmit a frequency multiplexed antenna beam based on a combination of the received first and second antenna beams.

In an example embodiment, the system further comprises first and second waveguides for polarizing the first and second antenna beams, respectively; the first antenna beam comprises a first polarization; and the second antenna beam comprises a second polarization orthogonal to the first polarization. In an example embodiment, the first polarization corresponds to a horizontal plane. In an example embodiment, the first polarization corresponds to a vertical plane.

In an example embodiment, the transceiver and the at least one antenna cooperate to transmit the first antenna beam at a first polarization and the second antenna beam at a second polarization, the first antenna beam being decoupled from the second antenna beam using orthogonal polarization.

In an example embodiment, at least one antenna comprises only one antenna, and the transceiver and the only one antenna cooperate to transmit the first antenna beam at a first polarization and the second antenna beam at a second polarization.

In an example embodiment, the at least one antenna comprises first and second antennas, and the transceiver and the first antenna cooperate to transmit the first antenna beam at a first polarization, and the transceiver and the second antenna cooperate to transmit the second antenna beam at a second polarization.

In another embodiment, the present disclosure provides a solid state RADAR antenna system, comprising: a primary antenna; a plurality of secondary antennas; and a plurality of transceivers in communication with the primary antenna and the plurality of secondary antennas. The plurality of transceivers and the primary antenna cooperate to transmit a primary antenna beam. The plurality of transceivers and the plurality of secondary antennas cooperating to transmit a plurality of secondary antenna beams, each of the plurality of secondary antenna beams being decoupled from the other antenna beams. A first secondary antenna beam of the plurality of antenna beams has an unambiguous scanning range based on a blind range of the primary antenna. A second secondary antenna beam of the plurality of antenna beams has an unambiguous scanning range based on a blind range of the first secondary antenna.

In an example embodiment: each of the plurality of transceivers is uniquely associated with either the primary antenna or one of the plurality of secondary antennas; the plurality of transceivers and the plurality of antennas is equal in number and cooperating to transmit the primary antenna beam and the plurality of secondary antenna beams;

and each of the primary antenna beam and the plurality of secondary antenna beams is physically decoupled from each other.

In a further embodiment, the present disclosure provides a solid state RADAR antenna system comprising: a base; first and second antennas coupled to the base so as to provide a common rotational axis for the first and second antennas. The first antenna is configured to transmit a first antenna beam for a first transmit period. The second antenna is configured to transmit a second antenna beam, independent of transmission of the first antenna beam, for a second transmit period, and with a second transmission repetition interval. The first antenna has an unambiguous range defining a distance beyond which the first antenna unambiguously receives echo signals and having a blind range defining a distance within which the first antenna is unable to receive echo signals during the first transmit period. The second transmission repetition interval is selected so that the second antenna has an unambiguous range substantially equal to the blind range of the first antenna.

In an example embodiment, the system further comprises: third and fourth antennas coupled to the base so as to provide a common rotational axis for the first, second, third and fourth antennas.

In an example embodiment, the third antenna is configured to transmit a third beam for a third transmit period, with a third transmission repetition interval selected so that the third antenna has an unambiguous range substantially equal to a blind range of the second antenna. The fourth antenna is configured to transmit a fourth beam for a fourth transmit period, with a fourth transmission repetition interval selected so that the fourth antenna has an unambiguous range substantially equal to a blind range of the third antenna.

In an example embodiment, the third antenna is configured to transmit a third antenna beam for a third transmit period; and the fourth antenna is configured to transmit a fourth antenna beam, independent of transmission of the third antenna beam, for a fourth transmit period, with a fourth transmission repetition interval. The third antenna having an unambiguous range defining a distance beyond which the third antenna unambiguously receives echo signals and having a blind range defining a distance within which the third antenna is unable to receive echo signals during the third transmit period. The fourth transmission repetition interval is selected so that the fourth antenna has an unambiguous range substantially equal to the blind range of the third antenna.

In an example embodiment, the first and second antennas operate at a first beam frequency and the third and fourth antenna operate at a second beam frequency to provide a dual band RADAR.

In an example embodiment, the first beam frequency and the second beam frequency are different beam frequencies. In an example embodiment, the first beam frequency operates at C-band. In an example embodiment, the second beam frequency operates at X-band.

In another embodiment, the present disclosure provides a processor-implemented method for calibrating a solid state RADAR antenna system comprising a processor, at least one antenna and a transceiver configured to transmit first and second antenna beams, the method comprising: calculating a transmission repetition interval based on a desired maximum unambiguous range associated with the second antenna beam, the desired maximum unambiguous range overlapping being based on a first blind range associated with the first antenna beam; and calculating a transmit period based on the calculated transmission repetition interval; wherein the second antenna is configured to transmit the second antenna beam based on the calculated transmit period and transmission repetition interval so as to scan in the first blind range.

In a further embodiment, the present disclosure provides a solid state RADAR antenna system comprising: at least one antenna; a transceiver in communication with the at least one antenna to transmit first and second antenna beams; a processor in communication with the transceiver; and a non-transitory machine-readable memory storing statements and instructions for execution by the processor to: calculate a transmission repetition interval based on a desired maximum unambiguous range associated with the second antenna beam, the desired maximum unambiguous range overlapping being based on a first blind range associated with the first antenna beam; and calculate a transmit period based on the calculated transmission repetition interval; wherein the second antenna is configured to transmit the second antenna beam based on the calculated transmit period and transmission repetition interval so as to scan in the first blind range.

In another embodiment, the present disclosure provides a solid state RADAR antenna system, comprising: at least one antenna; and a transceiver in communication with the at least one antenna. The transceiver and the at least one antenna cooperate to transmit a first antenna beam and a second antenna beam, the first antenna beam being decoupled from the second antenna beam, the second antenna beam having an unambiguous scanning range based on a blind range of the first antenna.

In an example embodiment, the second antenna beam has an unambiguous scanning range that overlaps with the blind range of the first antenna.

In an example embodiment, the transceiver and the at least one antenna are configured to transmit the second antenna beam over a second transmission repetition interval so that the unambiguous scanning range of the second antenna beam, which is associated with the second transmission repetition interval, overlaps with the blind range of the first antenna.

In further example embodiments, the solid state RADAR antenna system comprises combinations of features and sub-features recited herein. Such additional example embodiments include all reasonable combinations of features or sub-features that are described or illustrated herein, whether or not explicitly provided in such combinations of features or sub-features, and include all operable combinations as understood by one of ordinary skill in the art.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A solid state RADAR antenna system, comprising:
   a first antenna and a second antenna; and
   a first transceiver in communication with the first antenna;
   a second transceiver in communication with the second antenna,
   the first transceiver and the first antenna cooperating to transmit a first antenna beam in a first direction;
   the second transceiver and the second antenna cooperating to transmit a second antenna beam in a second direction different from the first direction such that, the first antenna beam does not impinge on the second antenna beam,
   the first antenna beam comprising a first pulse transmitted over a first transmission repetition interval for a first transmit period, the first antenna beam having a first maximum unambiguous range associated with the first transmission repetition interval and having a first blind range associated with the first transmit period,
   the second antenna beam comprising a second pulse transmitted over a second transmission repetition interval for a second transmit period, the second antenna beam having a second maximum unambiguous range associated with the second transmission repetition interval,
   the transceiver and the second antenna configured to transmit the second pulse over the second transmission repetition interval so that the second unambiguous range overlaps with the first blind range.

2. The system of claim 1 wherein the second transceiver and the second antenna are configured to transmit the second pulse over the second transmission repetition interval so that the second unambiguous range overlaps with a portion of the first blind range.

3. The system of claim 1 wherein the second transceiver and the second antenna are configured to transmit the second pulse over the second transmission repetition interval so that the second unambiguous range encompasses the entire first blind range.

4. The system of claim 1 wherein the second transceiver and the second antenna are configured to transmit the second pulse over the second transmission repetition interval so that the second unambiguous range is substantially equal to the first blind range.

5. The system of claim 1 wherein:
   the first transceiver and the first antenna cooperate to transmit the first antenna beam at a first frequency, and the second transceiver and the second antenna cooperate to transmit the second antenna beam at a second frequency equal to the first frequency.

6. The system of claim 1 wherein the first transceiver and the first antenna cooperate to transmit the first antenna beam at a first frequency, and the second transceiver and the second antenna cooperate to transmit the second antenna beam at a second frequency different from the first frequency.

7. The system of claim 6 further comprising:
   a waveguide combiner coupled to the first and second transceivers to receive the first and second antenna beams and to transmit a frequency multiplexed antenna beam based on a combination of the received first and second antenna beams.

8. The system of claim 6 further comprising:
   first and second waveguides for polarizing the first and second antenna beams, respectively;
   the first antenna beam comprising a first polarization; and,
   the second antenna beam comprising a second polarization orthogonal to the first polarization.

9. The system of claim 1 wherein the first transceiver and the first antenna cooperate to transmit the first antenna beam at a first polarization, and the second transceiver and the second antenna cooperate to transmit the second antenna beam at a second polarization orthogonal to the first polarization.

10. A solid state RADAR antenna system, comprising:
    a primary antenna;
    a plurality of secondary antennas; and
    a plurality of transceivers in communication with the primary antenna and the plurality of secondary antennas,
    the plurality of transceivers and the primary antenna cooperating to transmit a primary antenna beam,
    the plurality of transceivers and the plurality of secondary antennas cooperating to transmit a plurality of secondary antenna beams in a corresponding plurality of different directions such that, each of the plurality of secondary antenna beams does not impinge on the other antenna beams,
    a first secondary antenna beam of the plurality of antenna beams having an unambiguous scanning range based on a blind range of the primary antenna, and
    a second secondary antenna beam of the plurality of antenna beams having an unambiguous scanning range based on a blind range of the first secondary antenna.

11. The system of claim 10 wherein each of the plurality of transceivers is uniquely associated with either the primary antenna or one of the plurality of secondary antennas, the plurality of transceivers and the plurality of antennas being equal in number and cooperating to transmit the primary antenna beam and the plurality of secondary antenna beams.

12. A solid state RADAR antenna system comprising:
    a base;
    first and second antennas coupled to the base so as to provide a common rotational axis for the first and second antennas,
    the first antenna being configured to transmit a first antenna beam for a first transmit period in a first direction relative to the base,
    the second antenna being configured to transmit a second antenna beam in a second direction relative to the base, independent of transmission of the first antenna beam, for a second transmit period, and with a second transmission repetition interval, the second direction being different than the first direction such that, the second antenna beam does not impinge on the first antenna beam;

the first antenna having an unambiguous range defining a distance beyond which the first antenna unambiguously receives echo signals and having a blind range defining a distance within which the first antenna is unable to receive echo signals during the first transmit period, the second transmission repetition interval is selected so that the second antenna has an unambiguous range substantially equal to the blind range of the first antenna.

13. The solid state RADAR antenna system of claim 12 further comprising:

third and fourth antennas coupled to the base so as to provide a common rotational axis for the first, second, third and fourth antennas.

14. The solid state RADAR antenna system of claim 13 wherein:

the third antenna being configured to transmit a third beam for a third transmit period, with a third transmission repetition interval selected so that the third antenna has an unambiguous range substantially equal to a blind range of the second antenna; and, the fourth antenna being configured to transmit a fourth beam for a fourth transmit period, with a fourth transmission repetition interval selected so that the fourth antenna has an unambiguous range substantially equal to a blind range of the third antenna.

15. The solid state RADAR antenna system of claim 13 wherein:

the third antenna being configured to transmit a third antenna beam for a third transmit period;

the fourth antenna being configured to transmit a fourth antenna beam, independent of transmission of the third antenna beam, for a fourth transmit period, with a fourth transmission repetition interval the third antenna having an unambiguous range defining a distance beyond which the third antenna unambiguously receives echo signals and having a blind range defining a distance within which the third antenna is unable to receive echo signals during the third transmit period; and the fourth transmission repetition interval is selected so that the fourth antenna has an unambiguous range substantially equal to the blind range of the third antenna.

16. The solid state RADAR antenna system of claim 15 wherein:

the first and second antennas operate at a first beam frequency and the third and fourth antenna operate at a second beam frequency to provide a dual band RADAR.

17. The solid state RADAR antenna system of claim 16 wherein:

the first beam frequency and the second beam frequency are different beam frequencies.

* * * * *